(12) United States Patent
Sakurai et al.

(10) Patent No.: US 9,384,177 B2
(45) Date of Patent: Jul. 5, 2016

(54) FILE HISTORY RECORDING SYSTEM, FILE HISTORY MANAGEMENT SYSTEM AND FILE HISTORY RECORDING METHOD

(75) Inventors: Takao Sakurai, Tokyo (JP); Yukihisa Fujita, Yokohama (JP); Ken Naono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1127 days.

(21) Appl. No.: 13/255,169

(22) PCT Filed: May 27, 2011

(86) PCT No.: PCT/JP2011/062247
§ 371 (c)(1),
(2), (4) Date: Sep. 7, 2011

(87) PCT Pub. No.: WO2012/164648
PCT Pub. Date: Dec. 6, 2012

(65) Prior Publication Data
US 2012/0303684 A1  Nov. 29, 2012

(51) Int. Cl.
*G06F 17/30* (2006.01)
*G06F 17/22* (2006.01)
(52) U.S. Cl.
CPC ...... *G06F 17/2288* (2013.01); *G06F 17/30115* (2013.01)
(58) Field of Classification Search
CPC ..... G06F 17/2288; G06F 17/24; G06F 17/30; G06F 21/6218; G06F 17/30115
USPC .......................................................... 707/827
See application file for complete search history.

(56) References Cited

U.S. PATENT DOCUMENTS

| | | | |
|---|---|---|---|
| 8,145,687 B2* | 3/2012 | Nakashiro | G06F 17/30144 707/822 |
| 2003/0217038 A1* | 11/2003 | Kageyama et al. | 707/1 |
| 2004/0167921 A1 | 8/2004 | Carson et al. | |
| 2005/0033777 A1* | 2/2005 | Moraes et al. | 707/202 |
| 2006/0265428 A1* | 11/2006 | Chai | G06F 17/30115 |
| 2010/0049785 A1* | 2/2010 | Stoyanov et al. | 709/203 |
| 2010/0058166 A1* | 3/2010 | Chikyu | 715/230 |
| 2011/0016110 A1 | 1/2011 | Egi et al. | |

FOREIGN PATENT DOCUMENTS

| | | |
|---|---|---|
| JP | 2003-44469 A | 2/2003 |
| JP | 2006-516775 A | 7/2006 |

(Continued)

OTHER PUBLICATIONS

International Preliminary Report on Patentability received in International Application No. PCT/JP2011/062247 dated Dec. 12, 2013.

*Primary Examiner* — Tony Mahmoudi
*Assistant Examiner* — Merilyn Nguyen
(74) *Attorney, Agent, or Firm* — Mattingly & Malur, PC

(57) ABSTRACT

At the time of copy & paste, an item, a size and a paste content are recorded, and the importance of the paste is determined based on the number of pasted items, and a pasted data size relative to the overall file. Also, an item name and a change content are recorded, and when the manager inputs an important keyword (or unimportant keyword) in visualizing a file history, the importance is increased (or decreased) if the keyword is included in the item name or the change content. A function of displaying the file history in order of importance if the file history is displayed in table format in visualizing the file history, and a function of displaying, or highlighting, only the source file in which the importance is greater than or equal to a threshold set by the manager if the file history is displayed graphically are provided.

7 Claims, 40 Drawing Sheets

(56) References Cited

FOREIGN PATENT DOCUMENTS

| JP | 2008-269020 A | 11/2008 |
| JP | 2009-129004 A | 6/2009 |
| JP | 2010-26849 A | 2/2010 |
| JP | 2010-128916 A | 6/2010 |
| JP | 2010-160538 A | 7/2010 |
| JP | 2011-22705 A | 2/2011 |

* cited by examiner

| id | TIME | OPERATION NAME |
|---|---|---|
| 001 | 11/01/05 16:19:20 | file copy |
| 002 | 11/01/08 18:07:42 | file copy |
| 003 | 11/01/09 11:47:09 | file copy |
| 004 | 11/01/10 13:30:38 | file rename |
| 005 | 11/01/11 17:34:42 | copy & paste |
| ... | ... | ... |
| 012 | 11/01/11 17:38:06 | copy & paste |
| 013 | 11/01/12 09:03:42 | copy & paste |
| 014 | 11/01/12 10:44:08 | copy & paste |
| ... | ... | ... |
| 021 | 11/01/12 10:45:42 | copy & paste |

| OPERATION INHERENT INFORMATION | | | | |
|---|---|---|---|---|
| CHANGE INFORMATION | | | | |
| SOURCE INFORMATION | | DESTINATION INFORMATION | | PASTE DATA SIZE |
| DOCUMENT DESIGNATION INFORMATION | SITE DESIGNATION INFORMATION | DOCUMENT DESIGNATION INFORMATION | SITE DESIGNATION INFORMATION | |
| Z:¥a.xls | | C:¥a.xls | | |
| Z:¥b.xls | | D:¥b.xls | | |
| C:¥a.xls | | C:¥a2.xls | | |
| C:¥a.xls | | C:¥c.xls | | |
| C:¥a2.xls | product name | C:¥c.xls | product name | 15kbyte |
| ... | ... | ... | ... | ... |
| C:¥a2.xls | addressee | C:¥c.xls | addressee | 17kbyte |
| C:¥a3.xls | list price | C:¥c.xls | selling price | 10kbyte |
| D:¥b.xls | address | C:¥c.xls | customer address | 18kbyte |
| ... | ... | ... | ... | ... |
| D:¥b.xls | remarks | C:¥c.xls | remarks | 83kbyte |

FIG.8

| REFERENTIAL DOCUMENT | SOURCE FILE |
|---|---|
| C:¥a.xls | Z:¥a.xls |
| Z:¥b.xls | D:¥b.xls |
| C:¥a2.xls | Z:¥a.xls |
| C:¥c.xls | Z:¥a.xls |
| C:¥a3.xls | C:¥a3.xls |

| id | TIME | OPERATION NAME | SOURCE INFORMATION | DESTINATION INFORMATION | IMPORTANCE |
|---|---|---|---|---|---|
| 001 | 11/01/05 16:19:20 | file copy | Z:¥a.xls | C:¥a.xls | |
| 002 | 11/01/08 18:07:42 | file copy | Z:¥b.xls | D:¥b.xls | |
| 003 | 11/01/09 11:47:09 | file copy | C:¥a.xls | C:¥a2.xls | |
| 004 | 11/01/10 13:30:38 | file rename | C:¥a.xls | C:¥c.xls | |
| 005 | 11/01/11 17:34:42 | copy & paste | C:¥a2.xls | C:¥c.xls | 0.07 |
| 012 | 11/01/11 17:38:06 | copy & paste | C:¥a2.xls | C:¥c.xls | 0.08 |
| 013 | 11/01/12 09:03:42 | copy & paste | C:¥a3.xls | C:¥c.xls | 0.05 |
| 014 | 11/01/12 10:44:08 | copy & paste | D:¥b.xls | C:¥c.xls | 0.08 |
| 021 | 11/01/12 10:45:42 | copy & paste | D:¥b.xls | C:¥c.xls | 0.30 |

FIG.10

| id | TIME | SOURCE INFORMATION | DESTINATION INFORMATION | IMPORTANCE |
|---|---|---|---|---|
| 001 | 11/01/11 17:38:06 | C:¥a2.xls | C:¥c.xls | 0.15 |
| 002 | 11/01/12 09:03:42 | C:¥a3.xls | C:¥c.xls | 0.05 |
| 003 | 11/01/12 10:45:42 | D:¥b.xls | C:¥c.xls | 0.38 |

FIG.14

| id | TIME | OPERATION NAME |
|---|---|---|
| 001 | 11/01/05 16:19:20 | file copy |
| 002 | 11/01/08 18:07:42 | file copy |
| 003 | 11/01/09 11:47:09 | file copy |
| 004 | 11/01/10 13:30:38 | file rename |
| 005 | 11/01/11 17:34:42 | copy & paste |
| ... | ... | ... |
| 012 | 11/01/11 17:38:06 | copy & paste |
| 013 | 11/01/12 09:03:42 | copy & paste |
| 014 | 11/01/12 10:44:08 | copy & paste |
| ... | ... | ... |
| 021 | 11/01/12 10:45:42 | copy & paste |

| OPERATION INHERENT INFORMATION | | | | | |
|---|---|---|---|---|---|
| CHANGE INFORMATION | | | | | |
| SOURCE INFORMATION | | DESTINATION INFORMATION | | PASTE DATA SIZE | PASTE CONTENT |
| DOCUMENT DESIGNATION INFORMATION | SITE DESIGNATION INFORMATION | DOCUMENT DESIGNATION INFORMATION | SITE DESIGNATION INFORMATION | | |
| Z:¥a.xls | | C:¥a.xls | | | |
| Z:¥b.xls | | D:¥b.xls | | | |
| C:¥a.xls | | C:¥a2.xls | | | |
| C:¥a.xls | | C:¥c.xls | | | |
| C:¥a2.xls | product name | C:¥c.xls | product name | 15kbyte | "personal computer" |
| ... | ... | ... | ... | ... | ... |
| C:¥a2.xls | addressee | C:¥c.xls | addressee | 17kbyte | "Tokyo-to..." |
| C:¥a3.xls | list price | C:¥c.xls | selling price | 10kbyte | "1000 yen" |
| D:¥b.xls | address | C:¥c.xls | customer address | 18kbyte | "Kanagawa-ken..." |
| ... | ... | ... | ... | ... | ... |
| D:¥b.xls | remarks | C:¥c.xls | remarks | 83kbyte | "This topic..." |

FIG.20

| id | TIME | OPERATION NAME | SOURCE INFORMATION | DESTINATION INFORMATION | IMPORTANCE |
|---|---|---|---|---|---|
| 001 | 11/01/05 16:19:20 | file copy | Z:¥a.xls | C:¥a.xls | |
| 002 | 11/01/08 18:07:42 | file copy | Z:¥b.xls | D:¥b.xls | |
| 003 | 11/01/09 11:47:09 | file copy | C:¥a.xls | C:¥a2.xls | |
| 004 | 11/01/10 13:30:38 | file rename | C:¥a.xls | C:¥c.xls | |
| 005 | 11/01/11 17:34:42 | copy & paste | C:¥a2.xls | C:¥c.xls | 0.07 |
| 012 | 11/01/11 17:38:06 | copy & paste | C:¥a2.xls | C:¥c.xls | 0.08 |
| 013 | 11/01/12 09:03:42 | copy & paste | C:¥a3.xls | C:¥c.xls | 0.55 |
| 014 | 11/01/12 10:44:08 | copy & paste | D:¥b.xls | C:¥c.xls | 0.08 |
| 021 | 11/01/12 10:45:42 | copy & paste | D:¥b.xls | C:¥c.xls | 0.30 |

FIG.22

| id | TIME | SOURCE INFORMATION | DESTINATION INFORMATION | IMPORTANCE |
|---|---|---|---|---|
| 001 | 11/01/11 17:38:06 | C:¥a2.xls | C:¥c.xls | 0.15 |
| 002 | 11/01/12 09:03:42 | C:¥a3.xls | C:¥c.xls | 0.55 |
| 003 | 11/01/12 10:45:42 | D:¥b.xls | C:¥c.xls | 0.38 |

FIG.23

| id | TIME | OPERATION NAME |
|---|---|---|
| 001 | 11/01/15 10:13:17 | copy & paste |
| 002 | 11/01/15 10:13:20 | copy & paste |

| OPERATION INHERENT INFORMATION ||||||
|---|---|---|---|---|---|
| CHANGE INFORMATION ||||||
| SOURCE INFORMATION || DESTINATION INFORMATION || PASTE DATA SIZE | PASTE CONTENT |
| DOCUMENT DESIGNATION INFORMATION | SITE DESIGNATION INFORMATION | DOCUMENT DESIGNATION INFORMATION | SITE DESIGNATION INFORMATION | | |
| Z:¥a.xls | remarks | C:¥x.xls | selling price | 83kbyte | "This product" |
| C:¥a3.xls | list price | C:¥x.xls | selling price | 10kbyte | "1000yen" |

FIG.26

| id | DOCUMENT DESIGNATION INFORMATION | SITE DESIGNATION INFORMATION |
|---|---|---|
| 001 | C:¥x.xls | selling price |

FIG.28

| id | TIME | OPERATION NAME | SOURCE INFORMATION | DESTINATION INFORMATION | IMPORTANCE |
|---|---|---|---|---|---|
| 001 | 11/01/15 10:13:17 | copy & paste | Z:¥a.xls | C:¥x.xls | 0.00 |
| 002 | 11/01/15 10:13:20 | copy & paste | C:¥a3.xls | C:¥x.xls | 0.20 |

FIG.30

| id | TIME | SOURCE INFORMATION | DESTINATION INFORMATION | IMPORTANCE |
|---|---|---|---|---|
| 001 | 11/01/11 17:38:06 | Z:¥a.xls | C:¥x.xls | 0.00 |
| 002 | 11/01/12 09:03:42 | C:¥a3.xls | C:¥x.xls | 0.20 |

FIG.31

| # | KEYWORD | PASTE POINT NUMBER |
|---|---|---|
| 1 | amount of money | 0.50 |
| 2 | price | 0.50 |
| 3 | customer | 0.05 |
| 4 | remarks | -0.30 |
| 5 | annotation | -0.30 |

FIG.33

| id | TIME | OPERATION NAME |
|---|---|---|
| 001 | 11/01/05 16:19:20 | file copy |
| 002 | 11/01/08 18:07:42 | file copy |
| 003 | 11/01/09 11:47:09 | file copy |
| 004 | 11/01/10 13:30:38 | file rename |
| 005 | 11/01/11 17:34:42 | copy & paste |
| ... | ... | ... |
| 012 | 11/01/11 17:38:06 | copy & paste |
| 013 | 11/01/12 09:03:42 | copy & paste |
| 014 | 11/01/12 10:44:08 | copy & paste |
| ... | ... | ... |
| 021 | 11/01/12 10:45:42 | copy & paste |

| OPERATION INHERENT INFORMATION | | | | | |
|---|---|---|---|---|---|
| CHANGE INFORMATION | | | | | |
| SOURCE INFORMATION | | DESTINATION INFORMATION | | PASTE | PASTE POINT |
| DOCUMENT DESIGNATION INFORMATION | SITE DESIGNATION INFORMATION | DOCUMENT DESIGNATION INFORMATION | SITE DESIGNATION INFORMATION | DATA SIZE | NUMBER |
| Z:¥a.xls | | C:¥a.xls | | | |
| Z:¥b.xls | | D:¥b.xls | | | |
| C:¥a.xls | | C:¥a2.xls | | | |
| C:¥a.xls | | C:¥c.xls | | | |
| C:¥a2.xls | product name | C:¥c.xls | product name | 15kbyte | 0.00 |
| ... | ... | ... | ... | ... | |
| C:¥a2.xls | addressee | C:¥c.xls | addressee | 17kbyte | 0.00 |
| C:¥a3.xls | list price | C:¥c.xls | selling price | 10kbyte | 0.50 |
| D:¥b.xls | address | C:¥c.xls | customer address | 18kbyte | 0.05 |
| ... | ... | ... | ... | ... | |
| D:¥b.xls | remarks | C:¥c.xls | remarks | 83kbyte | -0.30 |

FIG.36

| id | TIME | OPERATION NAME | SOURCE INFORMATION | DESTINATION INFORMATION | IMPORTANCE |
|---|---|---|---|---|---|
| 001 | 11/01/05 16:19:20 | file copy | Z:¥a.xls | C:¥a.xls | |
| 002 | 11/01/08 18:07:42 | file copy | Z:¥b.xls | D:¥b.xls | |
| 003 | 11/01/09 11:47:09 | file copy | C:¥a.xls | C:¥a2.xls | |
| 004 | 11/01/10 13:30:38 | file rename | C:¥a.xls | C:¥c.xls | |
| 005 | 11/01/11 17:34:42 | copy & paste | C:¥a2.xls | C:¥c.xls | 0.07 |
| 012 | 11/01/11 17:38:06 | copy & paste | C:¥a2.xls | C:¥c.xls | 0.08 |
| 013 | 11/01/12 09:03:42 | copy & paste | C:¥a3.xls | C:¥c.xls | 0.55 |
| 014 | 11/01/12 10:44:08 | copy & paste | D:¥b.xls | C:¥c.xls | 0.13 |
| 021 | 11/01/12 10:45:42 | copy & paste | D:¥b.xls | C:¥c.xls | 0.00 |

FIG.38

| id | TIME | SOURCE INFORMATION | DESTINATION INFORMATION | IMPORTANCE |
|---|---|---|---|---|
| 001 | 11/01/11 17:38:06 | C:¥a2.xls | C:¥c.xls | 0.15 |
| 002 | 11/01/12 09:03:42 | C:¥a3.xls | C:¥c.xls | 0.55 |
| 003 | 11/01/12 10:45:42 | D:¥b.xls | C:¥c.xls | 0.13 |

FIG. 39

FILE HISTORY RECORDING SYSTEM, FILE HISTORY MANAGEMENT SYSTEM AND FILE HISTORY RECORDING METHOD

TECHNICAL FIELD

The present invention relates to a file history recording system, a file history management system and a file history recording method, and more particularly to a file history recording system, a file history management system and a file history recording method that are used to keep track of a history of an electronic document that leaks out at a leakage time of an electronic classified document.

BACKGROUND ART

In the businesses with the IT, each business worker treats many classified documents where customer information or the latest technical information is described, in which there are serious casualties when these classified documents are brought outside the company (or outside the organization in the range of security management, hereinafter simply referred to as outside the company). Thus, to prevent the classified document from flowing outside the company, there is a demand for a technique for monitoring a file operation. For example, to specify a range of classified information when the classified document flows out, there is a demand for a mechanism for visualizing a file history such as "which file is a source?" or "how the file is changed?".

Also, a method for illustrating the relationship between file move and copy and copy & paste via a clipboard is disclosed (e.g., refer to patent document 1 and patent document 3). In the patent documents 1 and 3, there is proposed a mechanism for visualizing the relationship between files by recording from which item to which item the copy & paste is made inside the file and how the content is changed.

Also, in patent document 2, it is disclosed that if a development method for copying and modifying the similar process in the program development is employed, a system manages a copy such that when a bug is found in a copied range including an original program, a warning is automatically issued to a user of the copied range.

PRIOR ART DOCUMENTS

Patent Documents

Patent document 1: JP-A-2006-516775
Patent document 2: JP-A-2008-269020
Patent document 3: JP-A-2011-22705

DISCLOSURE OF THE INVENTION

Problems to be Solved by the Invention

However, in an attempt of displaying a list of files that are the source of a specific file using the mechanisms of the patent documents 1 and 3, for example, a great number of files may sometimes be the copy source if many materials are referred to in creating the specific file, whereby the visual confirmation may be sometimes hard in the visualization.

In the light of the above-mentioned problem, it is an object of the present invention to provide a file history recording system, a file history management system and a file history recording method for allowing a user to confirm visually a source file that is a source of relatively important change or a source file supposed to have a relatively high degree of influence from among plural source files that are the source of the specific file.

Means for Solving the Problems

An item, a size and a paste content are recorded at the time of copy & paste, and the importance (choice index) of the paste is determined with the number of pasted items and the pasted data size relative to the overall file as indices. Also, an item name and a change content are recorded, and when a manager inputs an important keyword (or unimportant keyword) in visualizing a file history, the importance is increased (or decreased) if the keyword is included in the item name or change content. Also, in visualizing the file history, there are provided a function of displaying the file history in order of importance if it is displayed in table format, and a function of displaying, or highlighting, only a source file in which the importance is over a predetermined threshold set by the manager if it is illustrated.

According to the first solving means of the present invention, there is provided a file history recording system comprising:
 a file history recording part for creating file history information including a file change content by an operation of an operator;
 a file history save part for accumulating successively the file history information;
 a control part for obtaining one or more source files that are source of a desired file by searching the file history information accumulated in the file history save part for the desired file; and
 a file history display part for displaying the one or more source files that are the source of the desired file;
 wherein the control part obtains a choice index based on the degree of change of data between the desired file and the source file, and highlights and displays a part of the file history for the desired file in accordance with the choice index, or displays the file history selected in accordance with the choice index, in the file history display part.

According to the second solving means of the present invention, there is provided a file history management system comprising:
 a file history save part for receiving file history information including a file change content by an operation of an operator and accumulating successively the file history information;
 a control part for obtaining one or more source files that are source of a desired file by searching the file history information accumulated in the file history save part for the desired file; and
 a file history display part for displaying the one or more source files that are the source of the desired file;
 wherein the control part obtains a choice index based on the degree of change of data between the desired file and the source file, and highlights and displays a part of the file history for the desired file in accordance with the choice index, or displays the file history selected in accordance with the choice index, in the file history display part.

According to the third solving means of the present invention, there is provided a file history recording method including steps of:
 creating file history information including a file change content by an operation of an operator;
 accumulating successively the file history information in a memory;

obtaining one or more source files that are source of a desired file by searching the accumulated file history information for the desired file; and obtaining a choice index based on the degree of change of data between the desired file and the source file, and highlighting and displaying a part of the file history for the desired file in accordance with the choice index, or displaying the file history selected in accordance with the choice index, in a file history display part.

By the present invention, it is possible to provide a file history recording system, a file history management system and a file history recording method for allowing a user to confirm visually a source file that is a source of relatively important change or a source file supposed to have a relatively high degree of influence from among plural source files that are the source of the specific file.

BRIEF DESCRIPTION OF THE DRAWINGS

FIG. 8 is a view showing one example of a set of file history information acquired from a user terminal.

FIG. 9 is one example of a referential document list.

FIG. 10 is one example of file history information with importance.

FIG. 14 is one example of the integrated file history information.

FIG. 20 is a view showing one example of a set of file history information including the paste content acquired from the user terminal according to the second embodiment.

FIG. 22 is one example of the file history information with importance using a keyword according to the second embodiment.

FIG. 23 is one example of the integrated file history information using the keyword according to the second embodiment.

FIG. 26 is one example of two pieces of file history information pasted to the same item of the same electronic document according to a third embodiment.

FIG. 28 is one example of a determination exclusion list according to the third embodiment.

FIG. 30 is one example of file history information with importance using a determination exclusion according to the third embodiment.

FIG. 31 is one example of integrated file history information using the determination exclusion according to the third embodiment.

FIG. 33 is a view showing one example of keyword and paste point number registered in a file history information acquisition part according to a fourth embodiment.

FIG. 36 is a view showing one example of a set of file history information including the paste point number determined by the keyword, which is acquired from the user terminal, according to the fourth embodiment.

FIG. 38 is one example of file history information with importance using the paste point number according to the fourth embodiment.

FIG. 39 is one example of integrated file history information using the paste point number according to the fourth embodiment.

BEST MODE FOR CARRYING OUT THE INVENTION

1. First Embodiment

Hardware Configuration and Data Organization

Figure 1:
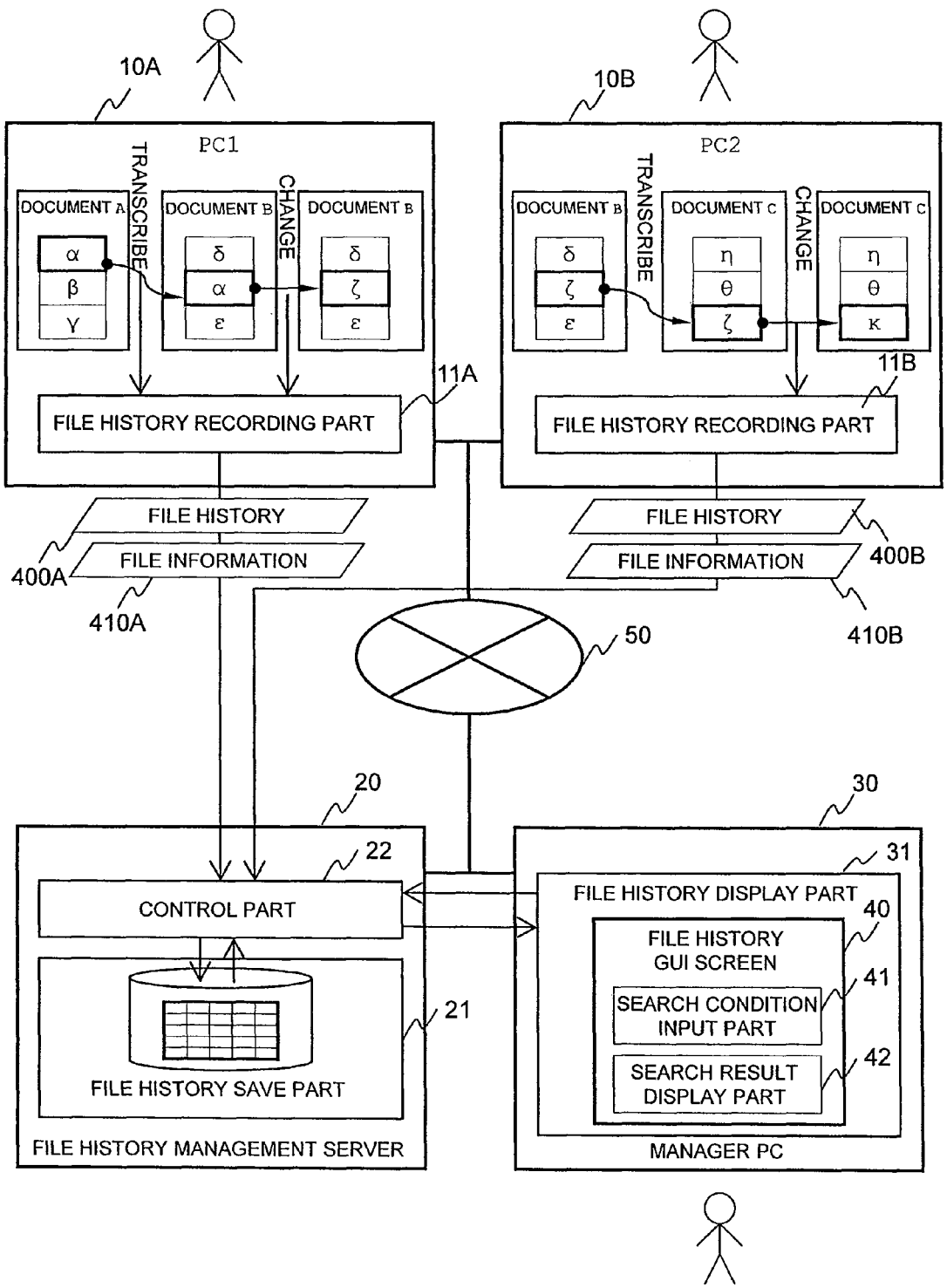
FIG. 1 is a view showing one example of the configuration of a computer environment (a file history recording system) for realizing an embodiment of the invention.

FIG. 1 is a view showing one example of the configuration of a computer environment (a file history recording system) for realizing an embodiment of the invention.

The file history recording system comprises a PC (user terminal) 10 operated by an operator, a file history management server 20 and a manager PC (manager terminal) 30 operated by a manager, for example. These units are communicable with each other via a network 50. Though the detailed configuration of each unit will be described later, the schematic configuration is shown in FIG. 1. The file history management server 20 and the manager terminal 30 may be configured as one unit (file history management system), and the file history management server 20 may comprise a file history display part 31.

Plural user terminals 10 may be provided. In FIG. 1, two PCs, PC1 (10A) and PC2 (10B), are shown as one example. In the following, unless the PC1 and the PC2 are distinguished, the PC is designated without sign A or B. The same applies to the other blocks and information. The user terminal 10 may be a portable terminal or an information processing apparatus such as a server that is capable of operating an appropriate electronic file, besides the PC.

The user terminal 10 has a file history recording part 11 (11A, 11B).

The file history recording part 11 records file information and file history information of an electronic file processed at the user terminal 10 by an operation of the operator. The file history information is a recording of a processing at the user terminal 10 applied to the file by the operation of the operator, and includes history information for the change of file name, copy of file, and copy & paste of data in the file, for example. The file history recording part 11 sends a file information 410 and a file history information 400 via the network 50 to the file history management server 20. The timing at which the file history recording part 11 sends the information may be appropriate, but the file history recording part 11 sends the information every time of recording data or sends the recorded data at a predetermined period, for example.

The file history management server 20 has a file history save part 21 and a control part 22.

The file history save part 21 accumulates successively the file history information 400 and the file information 410 received from the user terminal 10, for example.

The control part 22 searches the file history information accumulated in the file history save part 21 for a desired file and obtains one or more files that are source of the desired file. That is, a file history is obtained. Also, the control part 22 obtains a choice index of the file history information, for change of data in a file, based on the changed data size in the file and/or the number of changed items in the file.

The manager terminal 30 has the file history information display part 31. The file history information display part 31 displays a file history GUI screen 40 having a search condition input area 41 and a search result display part (display area) 42. The manager inputs a file name of a search object and time information into the search condition input area 41, using an input part such as a keyboard or mouse. The search result display part 42 displays a search result from the file history management server 20.

Figure 2:
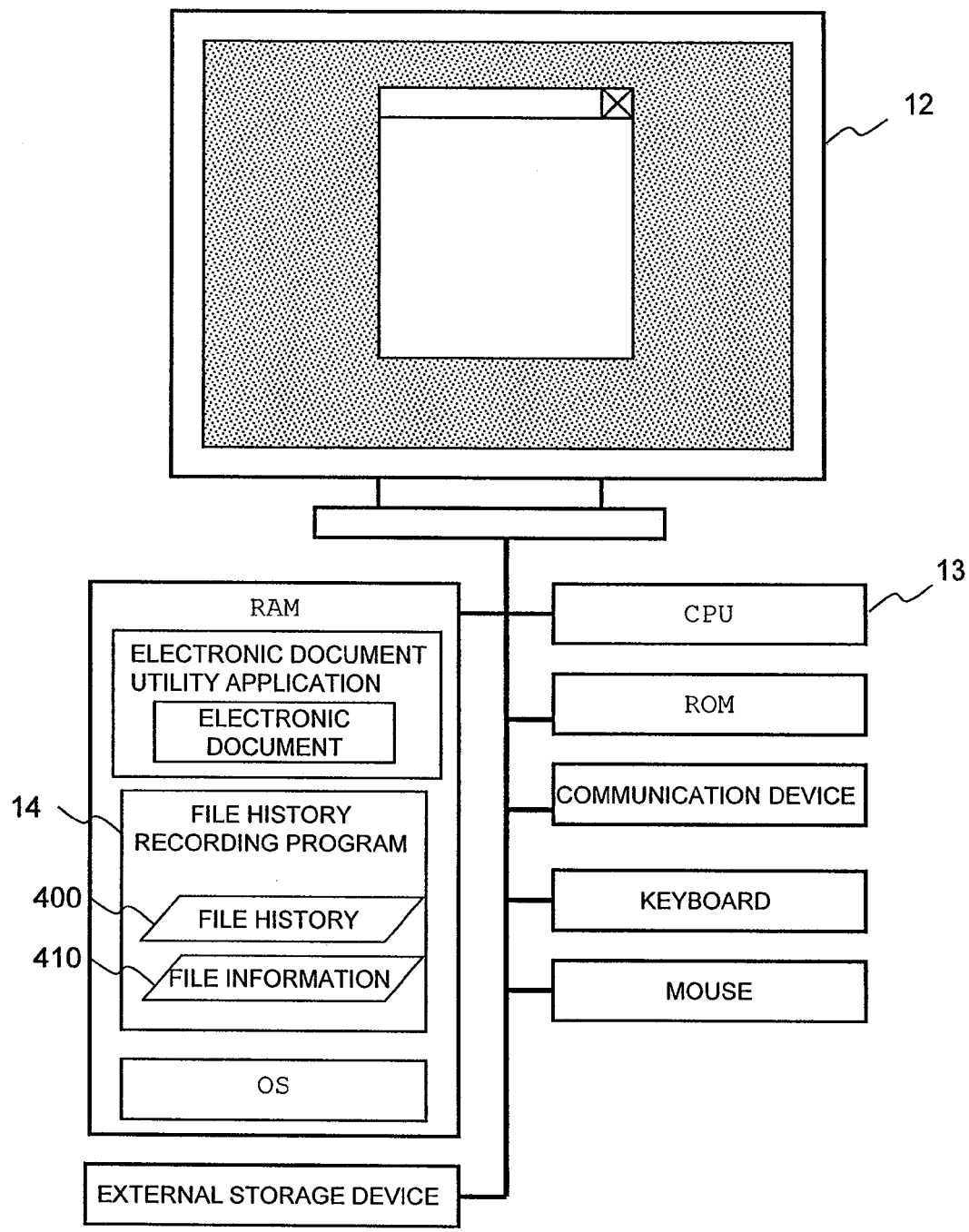
FIG. 2 is a view showing one example of the configuration of a device for recording a file history (corresponding to PC1 in FIG. 1).

FIG. 2 is a view showing one example of the configuration of a device for recording the file history (corresponding to the user terminal 10 in FIG. 1).

The user terminal 10 has a display part 12, a CPU (processing unit) 13, a memory such as a ROM or RAM, a communication device, an input part such as a keyboard or mouse, and an external storage device, for example. The RAM stores an electronic document utility application for processing an electronic document, a file history recording program 14, and an OS, each of which is read into the CPU 13 and executed. When the file history recording program 14 is executed by the CPU 13, the file history recording part 11 of FIG. 1 is realized. The electronic document is not limited to a text document, but may be an appropriate electronic file.

The file history information 400 and the file information 410 are created by the file history recording program 14, and stored at the user terminal 10. Each information may be stored in an appropriate storage area, besides being stored in the RAM as shown in the drawing. Also, the file history information 400 and the file information 410 are sent via the communication device to the file history management server 20 at an appropriate timing.

Figure 3:
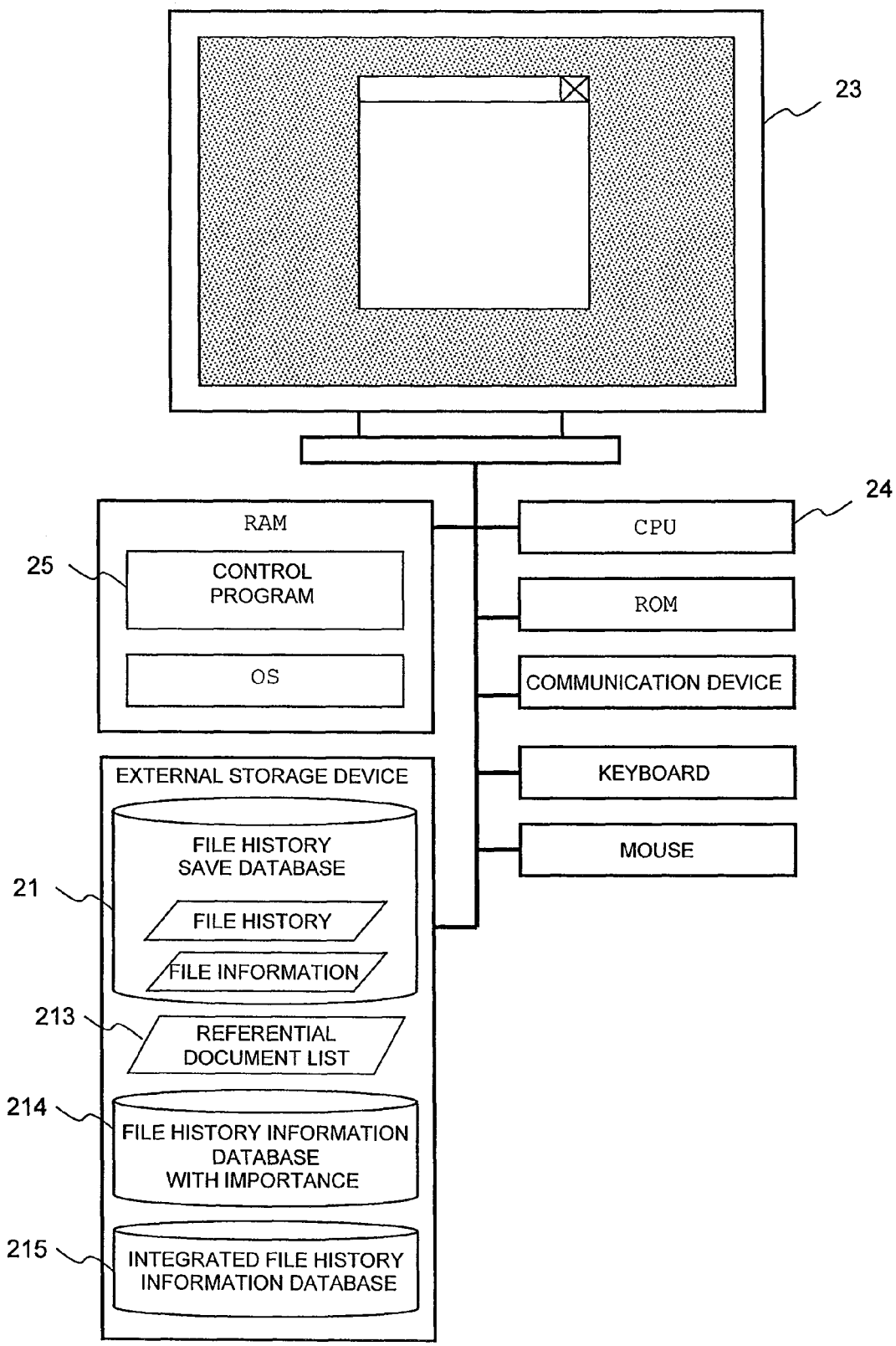
FIG. 3 is a view showing one example of the configuration of a device for recording and processing the file history (corresponding to a file history management server in FIG. 1).

FIG. 3 is a view showing one example of the configuration of a device for recording and processing the file history (corresponding to the file history management server 20 in FIG. 1).

The file history management server 20 has a display part 23, a CPU (processing unit) 24, a memory such as a ROM or RAM, a communication device, an input part such as a keyboard or mouse, and an external storage device, for example. The RAM stores a control program 25 and an OS, for example, each of which is read into the CPU 24 and executed. When the control program 25 is executed by the CPU 24, the control part 22 of FIG. 1 is realized.

The external storage device has the file history save database (file history save part) 21, a referential document list 213, a file history information database with importance 214, and an integrated file history information database 215. The file history save database 21 stores a set of file history information and file information received via the communication device from the user terminal 10, for example.

Figure 4:
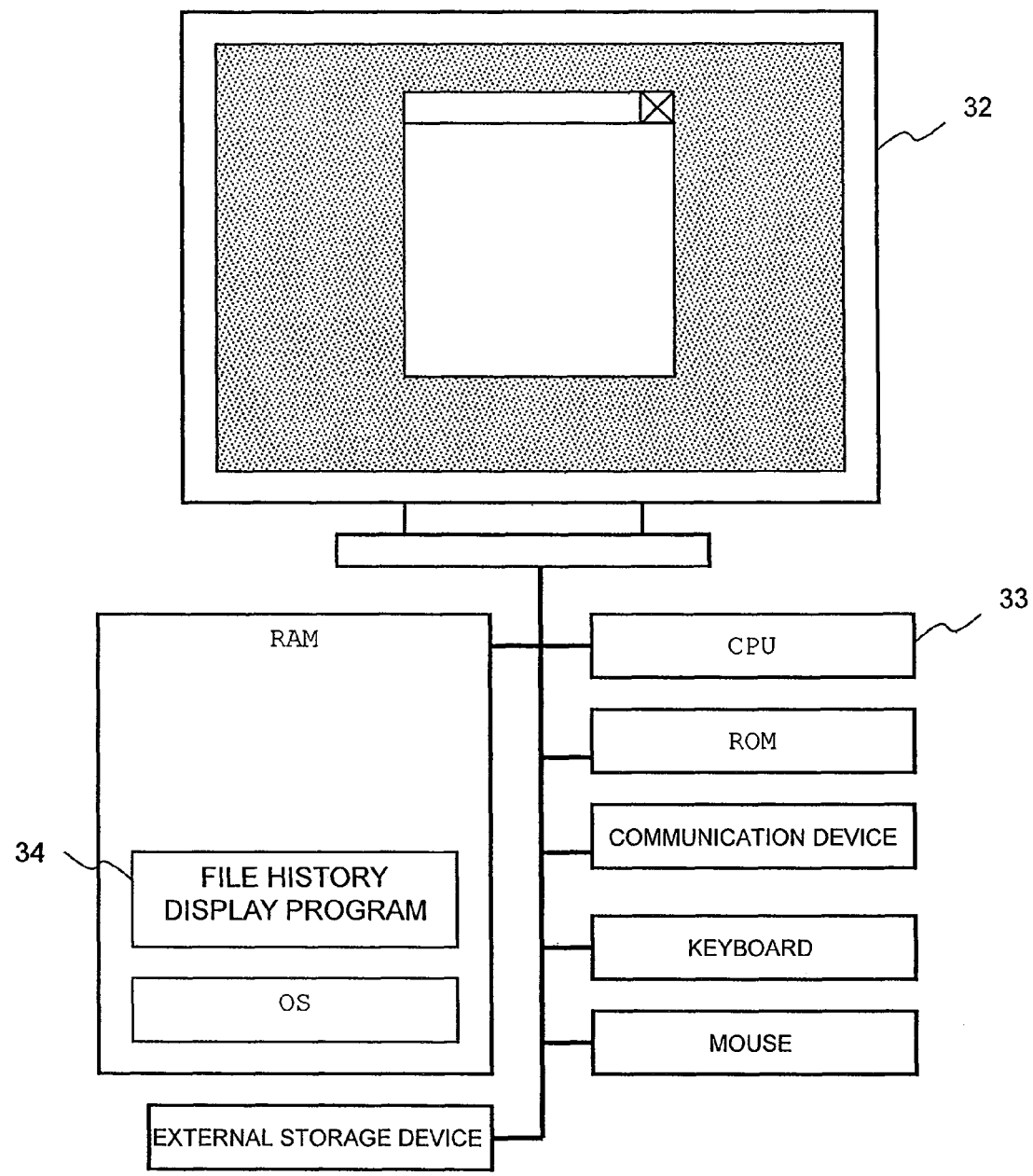
FIG. 4 is a view showing one example of the configuration of a device for displaying the file history (corresponding to a manager PC in FIG. 1).

FIG. 4 is a view showing one example of the configuration of a device for displaying the file history (corresponding to the manager terminal 30 in FIG. 1).

The manager terminal 30 has a display part 32, a CPU (processing unit) 33, a memory such as a ROM or RAM, a communication device, an input part such as a keyboard or mouse, and an external storage device, for example. The RAM stores a file history display program 34 and an OS, for example, each of which is read into the CPU 33 and executed. When the file history display program 34 is executed by the CPU 33, the file history display part 31 of FIG. 1 is realized.

Figure 5:
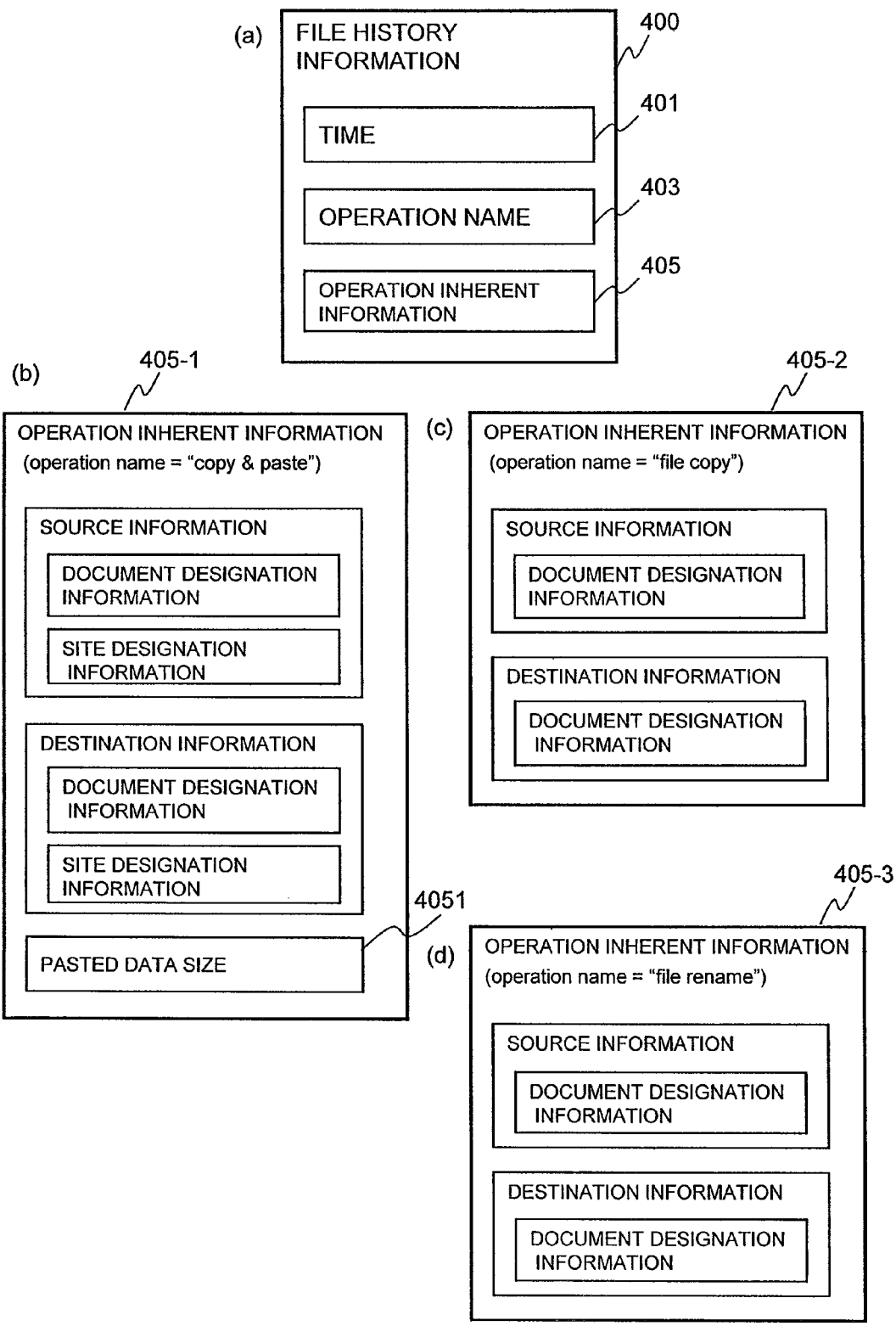
FIG. 5 is a view showing one example of the configuration of file history information.

FIG. 5 is a view showing one example of the configuration of file history information.

The file history information 400 is the recording of the operation on the file by the operator, and includes time information 401, operation name information 403 and operation inherent information 405, for example. Each information is recorded by the file history recording part 11, for example, at the time of file operation.

The time information 401 is the time when the operator operates the file, for example. It may be the time of recording the file history information.

The operation name information 403 is the information as to what operation the operator makes, indicating the copy & paste, file copy and file rename, for example. The operation name information may be appropriate identification information.

The operation inherent information 405 includes information according to the operation name information 403.

FIG. 5(*b*) shows operation inherent information 405-1 where the operation name information 403 indicates the "copy & paste". If the operation name information 403 indicates the "copy & paste", the operation inherent information 405-1 includes source information, destination information, and a pasted data size 4051.

The source information indicates a file and site (item) that are copy source of copy & paste. For example, the source information has document designation information that is identification information of file (e.g., file name including path information such as a recording medium and folder of storage target) and site designation information for specifying an item and position in the file. Herein, the document designation information indicates the file that is the copy source of copy & paste, and the site designation information indicates the site that is the copy source of copy and paste. The site designation information includes identification information of a text box in the document file, identification information of a cell in a data sheet, a slide in a presentation file and information for specifying a position in the slide, for example.

The destination information indicates a file and site that is a paste target of copy & paste. For example, the destination information has the document designation information and the site designation information. The document designation information and the site designation information are the same as the document designation information and the site designation information of the source information.

The pasted data size 4051 is the size of data that is copied and pasted. For example, it is recorded as the number of bytes, or may be recorded in any other appropriate units.

FIG. 5(*c*) shows an operation inherent information 405-2 where the operation name information 403 indicates the "file copy". If the operation name information 403 indicates the "file copy", the operation inherent information 405-2 includes the source information and the destination information. Herein, the file copy is an operation of copying the entire file, and each of the source information and the destination information includes the document designation information. The document designation information of source and the document designation information of destination are different in a part indicating the recording medium of save target, for example. The move of file may be treated in the same way as the file copy.

FIG. 5(*d*) shows an operation inherent information 405-3 where the operation name information 403 indicates the "file rename". If the operation name information 403 indicates the "file rename", the operation inherent information 405-3 includes the source information and the destination information. Herein, each of the source information and the destination information includes the document designation information.

Figure 6:
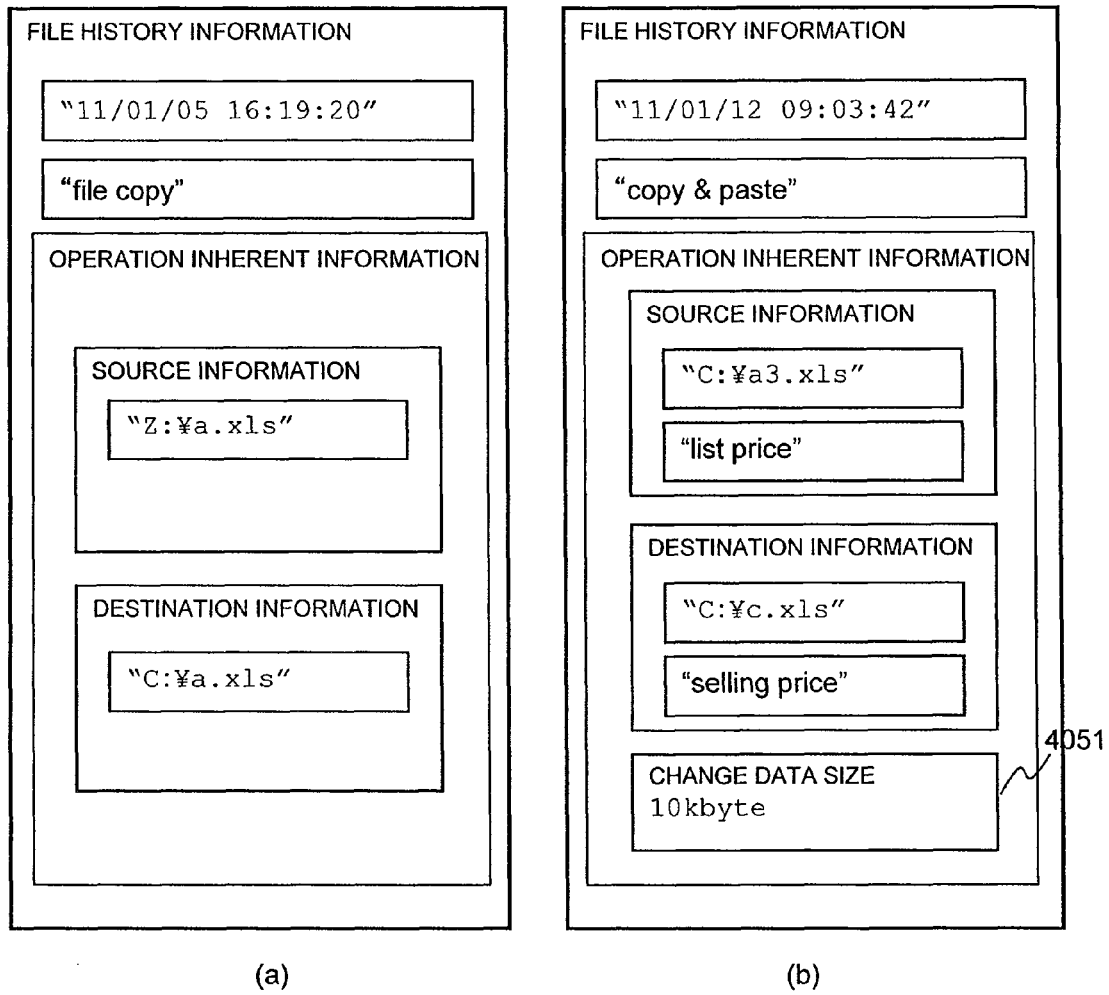
FIG. 6 is a view showing one example of acquired file history information.

FIG. 6 is a view showing one example of the acquired file history information.

FIG. 6(*a*) is an example of file copy. A file with the name of "a.xls" is copied from the recording medium in z drive to the recording medium in c drive.

FIG. 6(*b*) is an example of copy & paste. For example, data in a cell with the name of "list price" in a file of "C:¥a3.xls" is copied and pasted to a cell with the name of "selling price" in a file of "C:¥c.xls". The size 4051 of copy and pasted data is 10 kbyte in this example.

Figure 7:
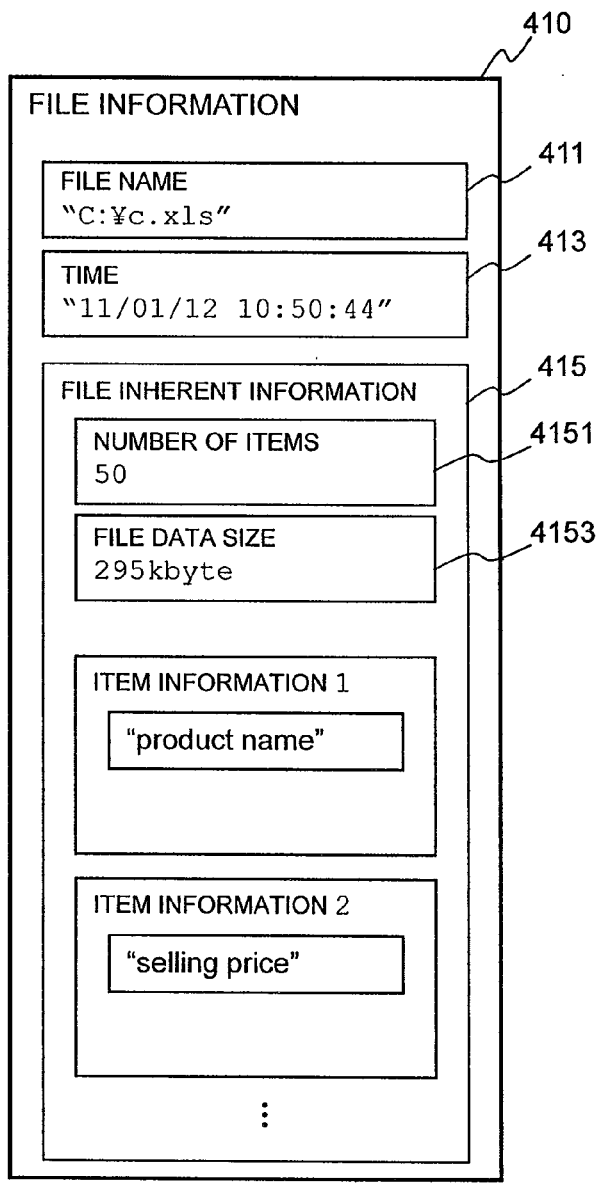
FIG. 7 is a view showing one example of the configuration of file information.

FIG. 7 is a view showing one example of the configuration of file information.

The file information 410 is attribute information (dump) of file. For example, the file information 410 includes a file name (document designation information) 411, a time information 413, and a file inherent information 415. The file inherent information 415 has a number of items 4151 in the file, a file data size 4153, and plural pieces of item information. The item information is information for specifying an appropriate site in the file such as a cell or a text box, for example.

FIG. 8 is a view showing one example of a set of file history information acquired from the user terminal 10.

For example, the file history management server 20 gives an id (identifier) such as identification number to the file history information 400 received from each user terminal 10, and successively stores it in the file history save part 21. The identifier may be given by the file history recording part 11 and sent. In this case, the file history management server 20 may further give an identifier of identifying the user terminal 10. The file history save part 21 stores the identifier, the time information, the operation name information and the operation inherent information associated with each other, for example. The operation inherent information includes the source information, the destination information and a paste data size. If the operation name information is file copy or file rename, the site designation information and the paste data size are blank because they are not provided. In this example, the identifier is given in order of time, and information is retrieved in descending order of the identifier (the number), whereby the history of file can be tracked.

FIG. 9 is one example of the referential document list stored in the file history management server 20.

The referential document list 213 stores referential document information indicating the document file related to the document designation information of search object to be inputted, and source file information indicating a source file of referential document, for example associated with each other. The referential document information and the source file information are stored as the file names, for example.

FIG. 10 is one example of file history information with importance that is stored in the file history management server 20.

The file history information with importance is stored in the file history information database with importance 214, for example, and stores the identifier (id), the time information, the operation name information, the source information, the destination information, and the importance obtained by the control part 22 associated with each other. The importance as will be detailed later is obtained and stored when the operation name information is copy & paste.

(Flowchart)

Figure 11:
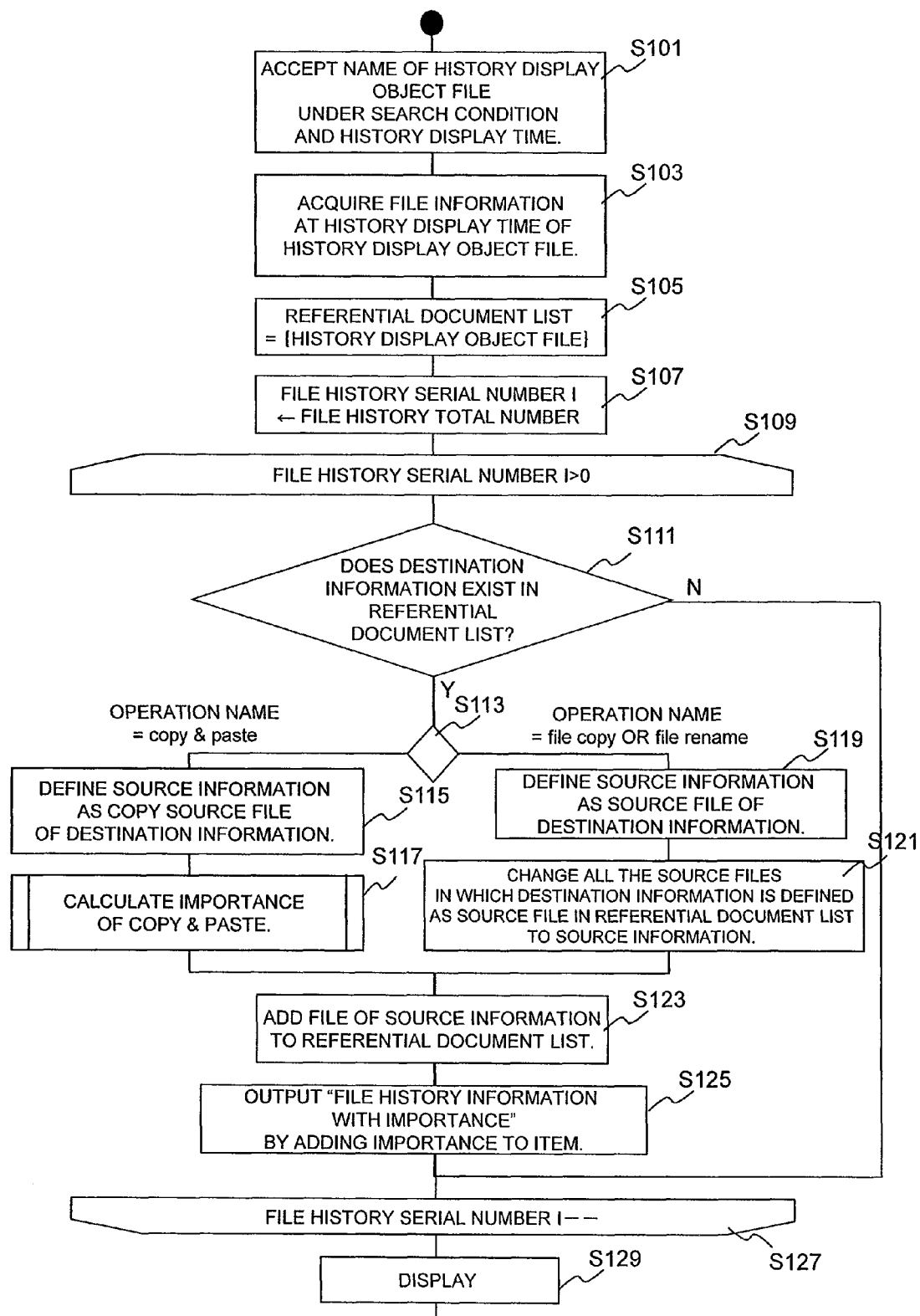
FIG. 11 is a flowchart showing a process for extracting a referential file list of a file history display object and a file history with importance from the file history.

FIG. 11 is a flowchart showing a process for extracting the referential file list of file history display object and the file history information with importance from the file history information. This flowchart is performed in the control part 22 (CPU 24) of the file history management server 20.

Before this flowchart is performed, the file history information 400 and the file information 410 are sent from the user terminal 10, and stored in the file history management server 20.

Figure 15:
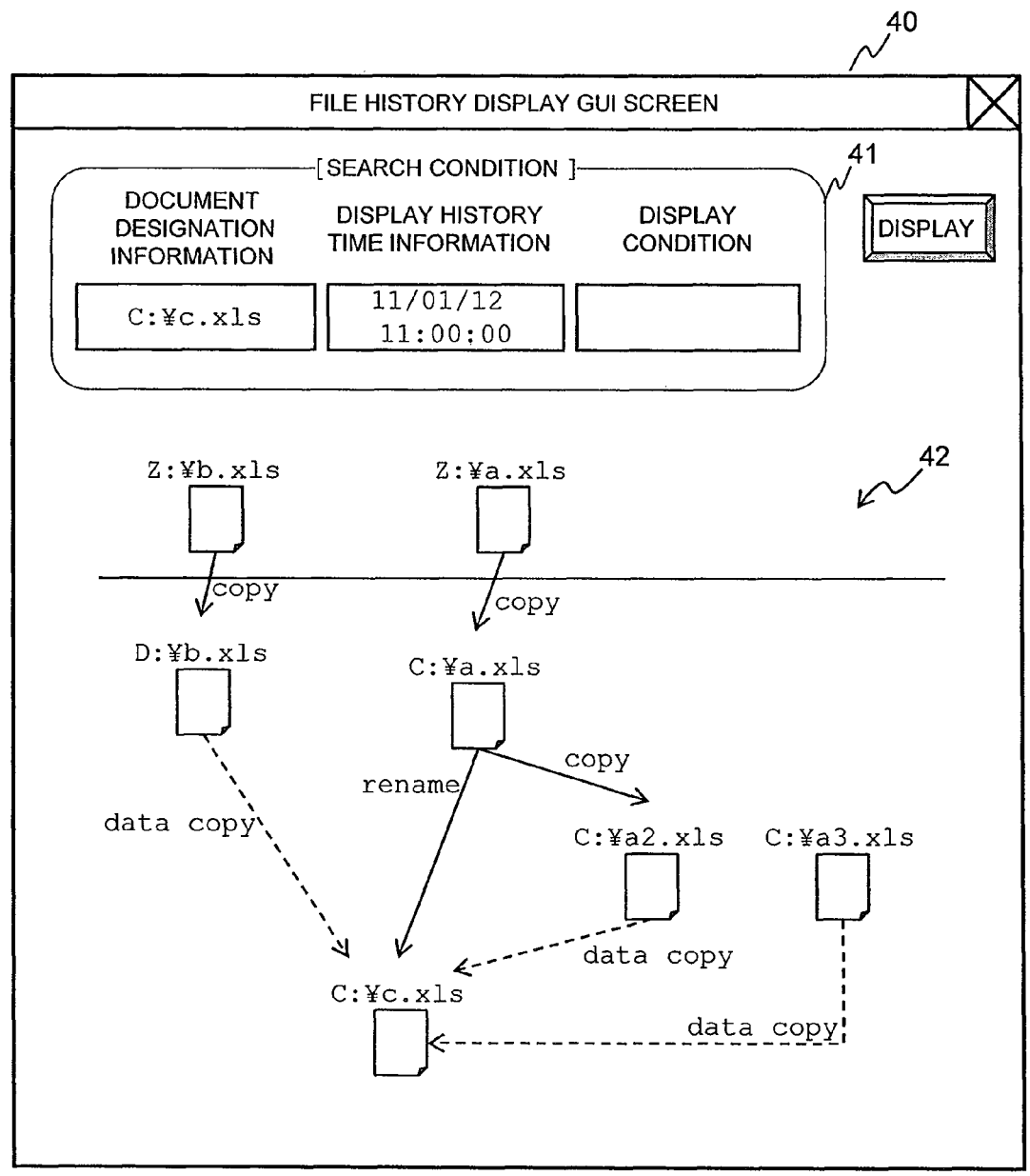
FIG. 15 is one example of a file history display screen according to a first embodiment.

The control part 22 of the file history management server 20 accepts a name of a history display object file under the search condition and a history display time (S101). For example, the control part 22 displays the file history display GUI screen 40 as shown in FIG. 15, and inputs the document designation information (name of the history display object file) inputted into the search condition input area 41 and display history time information (history display time).

The control part 22 acquires the file information at the history display time of the history display object file (S103). For example, the control part 22 acquires the file information 410 of the inputted history display object file from the external storage device. The file information may be changed with the time, in which the control part 22 acquires the file information at the time before and closest to the history display time in accordance with the inputted history display time and the time information 413 in the file information 410. In this way, for the file at a desired time, the file history can be acquired and displayed.

The control part 22 adds the history display object file to the referential document list 213 (S105). For example, the file name of the history display object file is stored in the referential document information of the referential document list 213.

The control part 22 sets the file history total number of the file history information (see FIG. 8) stored in the file history save database 21 to a file history serial number I (S107). For example, the maximum value of stored id may be set to the file history serial number I. The control part 22 may set the maximum id before the inputted history display time to the file history serial number I by referring to the time information of the file history save part 21.

The control part 22 checks if the file history serial number I is a positive number (S109), and if it is the positive number, repeats the following process. At step S127, the file history serial number I is decremented, whereby the following process is performed for all the entries of the file history save part 21 in descending order of id.

The control part 22 judges whether or not the destination information exists in the referential document list 213 (S111). More specifically, the control part 22 judges whether or not the document designation information stored in the destination information of an object entry exists in the referential document list 213, with the entry of the file history information of the file history save database 21 in which id is matched with the file history serial number I as the object entry. If it does not exist, the operation passes to step S127.

On the other hand, if it exists, the control part 22 causes the process to branch according to the operation name information (S113). If the operation name information is copy & paste, the operation goes to step S115, and if the operation name information is file copy or file rename, the operation goes to step S119.

At step S115, the control part 22 defines the source information as a copy source file of the destination information (S115). For example, the source information stored in the object entry of the file history information in the file history save database 21 is made the copy source file of the file indicated by the destination information. Also, the control part 22 stores the destination information and the source information of the object entry corresponding to the referential document information and the source file information of the referential document list 213.

Figure 12:
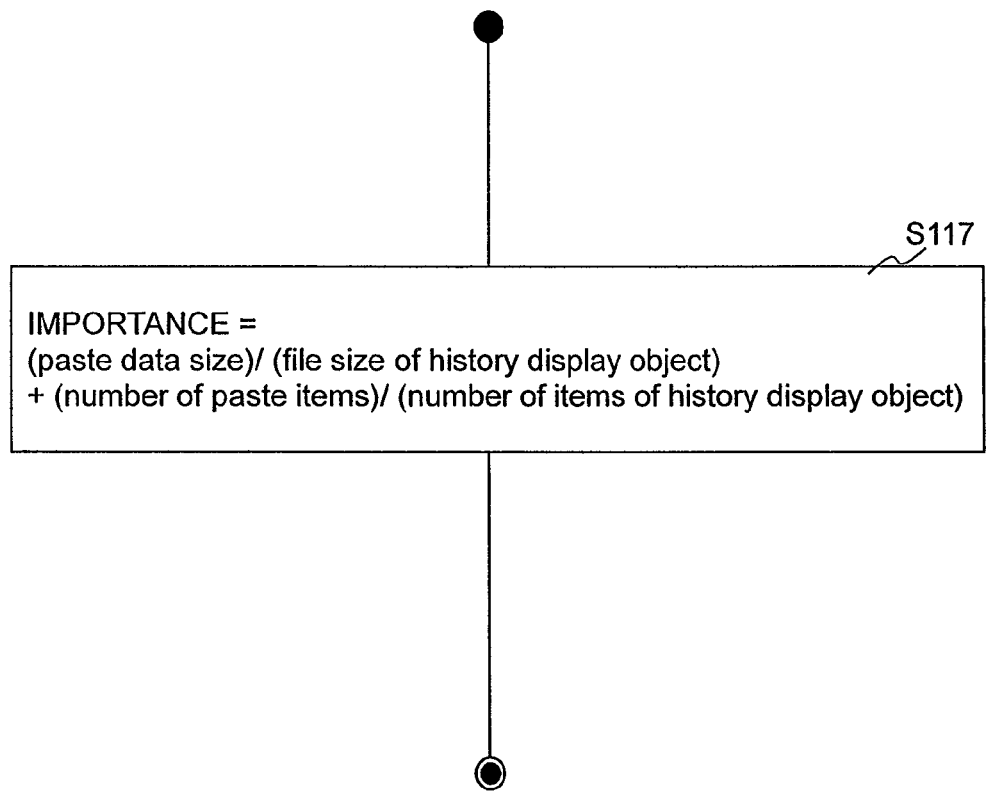
FIG. 12 is a flowchart showing a process for calculating the importance indicating how much influence a copy source document has on an electronic document of the file history display object from a file history of copy & paste.

The control part 22 calculates the importance of copy & paste (S117), and the operation goes to step S123. FIG. 12 shows a process for calculating the importance indicating how much influence a copy source document has on the electronic document of file history display object from the file history of copy & paste. The control part 22 calculates the importance in accordance with the following formula as shown in FIG. 12.

Importance=(paste data size)/(file size of history display object)+(number of paste items)/(number of items of history display object)

Herein, the paste data size is included in the file history information 400 (see FIG. 5(b)), and can be the paste data size 4051 stored in the object entry. The file size of history display object can be the file data size 4153 included in the file information 410. The number of paste items is judged from the site designation information of the operation inherent information. For example, when plural sites are operated, the site designation information for each operation is stored in the operation inherent information, and this number becomes the number of paste items. The file history information 400 may include the number of pasted items. The number of items of history display object can be the number of items 4151 included in the file information 410. Then, the operation goes to step S123.

The control part 22, in addition to obtaining the importance (choice index) in accordance with the above formula, may obtain the choice index of the file history information based on one or both of a ratio of the paste data size to the overall file data size, and a ratio of the number of paste items to the total number of items in the file. Also, the control part 22 may obtain the choice index of the file history information based on the changed data size in the file and/or the number of changed items in the file. Further, the control part 22 may obtain the choice index based on the degree of change of data between the desired file of display object and the source file, in addition to them.

On the other hand, at step S119, the control part 22 defines the source information as a source file of the destination information (S119). This point is the same as at step S115. The control part 22 stores the destination information and the source information stored in the object entry of the file history information in the file history save database 21 corresponding to the referential document information and the source file information of the referential document list 213.

The control part 22 changes all the source files in which the destination information is defined as the source file in the referential document list 213 to the source information (S121). For example, the control part 22 searches the source file information of the referential document list 213, and changes the source file information matched with the destination information of the object entry to the source information. The source information may be added successively to the source file information to arrange the file history in one entry.

At step S123, the control part 22 adds the file of the source information (document designation information) to the referential document list 213 (S123). For example, the source information is added to the referential document information of the referential document list 213.

The control part 22 adds the importance to each item of the file history information and outputs and stores it as "file history information with importance" to the file history information database with importance 214 (S125). In the case of file copy and file rename, the importance is not calculated, but each item of the file history information is output. FIG. 10 shows a configuration example of the file history information database with importance 214 where the file history information with importance is stored.

The control part 22 decrements the file history serial number I (S127), and repeats the process from step S109 to step S125. Then, the control part 22 displays the file history at the manager terminal 30 in accordance with the referential document list 213 (S129). For example, the control part 22 sends the referential document list 213 to the manager terminal 30, and the manager terminal 30 displays it in the file history display part 31.

Figure 13:
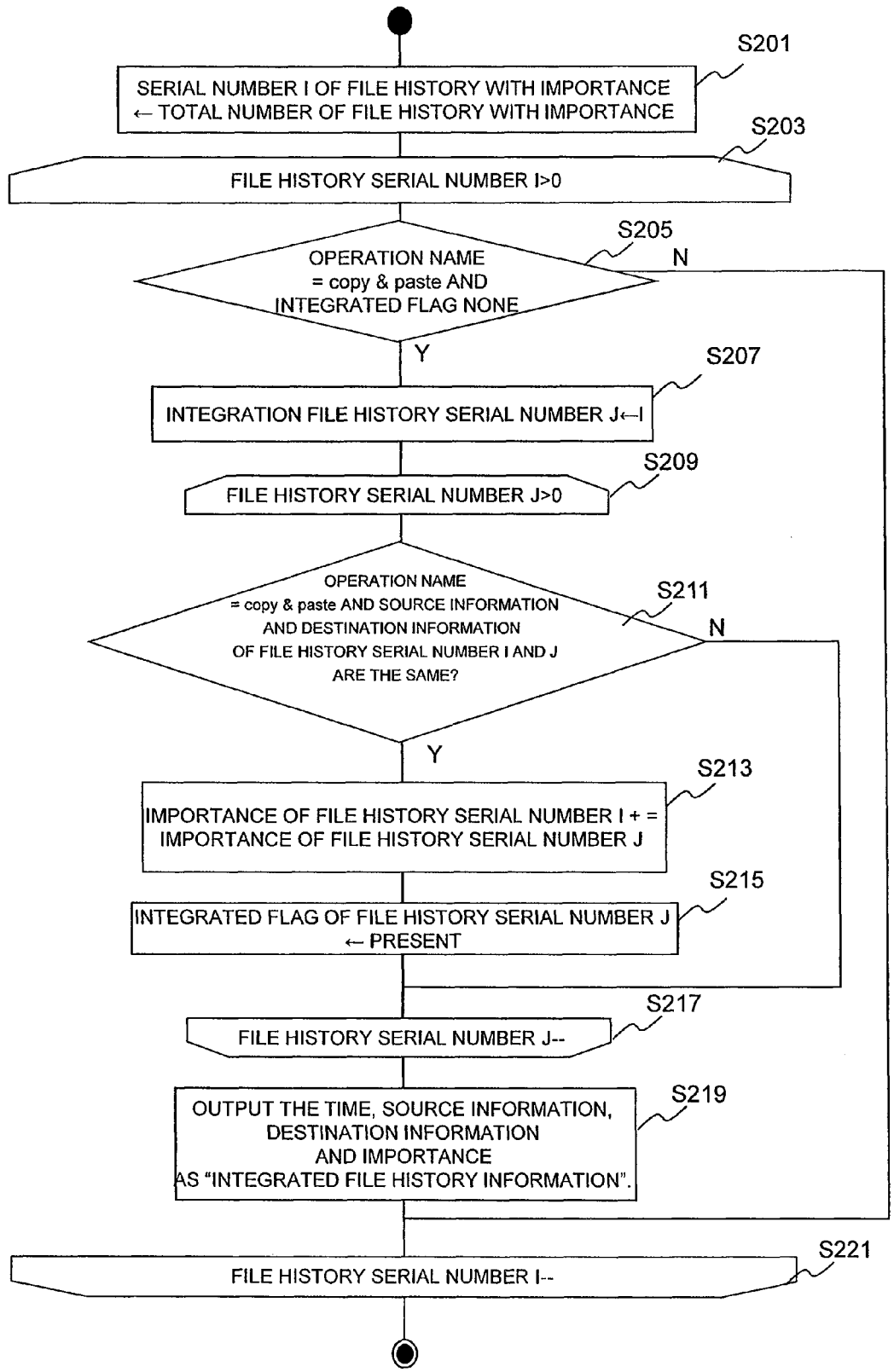
FIG. 13 is a flowchart for integrating the file history information with importance of the same source information and destination information and outputting the integrated file history information.

FIG. 13 is a flowchart for integrating the file history information with importance of the same source information and destination information and outputting the integrated file history information. For example, this is a process for integrating data of the file history information with importance in FIG. 10 in which the source information and the destination information are the same.

The file history information database with importance 214 includes, for each id, an integrated flag in which "present" is set if data has been already integrated and "none" is set if data has not been integrated. Other appropriate methods for checking whether data has been integrated or not may be employed, besides the above method.

The control part 22 sets the file history total number with importance of the file history information with importance (see FIG. 10) stored in the file history information database with importance 214 to the file history serial number I (file history serial number I with importance) (S201).

The control part 22 checks whether or not the file history serial number I is a positive number (S203), and if it is the positive number, repeats the following process.

The control part 22 judges whether or not the operation name information is copy & paste and the integrated flag is "none" (S205). More specifically, the control part 22 judges whether or not the operation name information of an object entry is copy & paste and the integrated flag is "none", with the entry of the file history information with importance of the file history information database with importance 214 in which id is matched with the file history serial number I as the object entry. If not, the operation passes to step S221. Even if there is no entry in which id is matched with the file history serial number I, the operation passes to step S221. The file history serial number I is decremented, so that the entry in which id is matched with the file history serial number I exists.

On the other hand, if the operation name of the object entry is copy & paste and the integrated flag is "none" (S205, Yes), the control part 22 substitutes the file history serial number I into a file history serial number J for integration (S207).

The control part 22 checks whether or not the file history serial number J is a positive number (S209), and if it is the positive number, repeats the following process. If the file history serial number J is not the positive number, the operation gets out of the repeating process and goes to step S219.

The control part 22 judges whether or not the operation name information is copy & paste and the source information and the destination information of the entry with the file history serial number I are the same as the source information and the destination information of the entry with the file history serial number J (S211). For example, the source information and the destination information are the same for the entry with id=021 and the entry with id=014 in the example of FIG. 10. If the source information and the destination information are not the same (S211, No), the operation goes to step S217.

On the other hand, if the source information and the destination information are the same (S211, Yes), the control part 22 adds the importance of the file history serial number J to the importance of the file history serial number I (S213). Also, the control part 22 sets the integrated flag of the file history serial number J to "present" (S215).

At step S217, the control part 22 decrements the file history serial number I (S217), and repeats the process from step S209 to step S215.

At step S219, the control part 22 outputs and stores "integrated file history information" including the time information, source information, destination information and added importance to the integrated file history information database 215 (S219). FIG. 14 shows one example of the integrated file history information. Herein, id is newly given.

At step S221, the control part 22 decrements the file history serial number I (S221), and repeats the process from step S203 to step S219.

(Display Example)

FIG. 15 is one example of the file history display screen according to the first embodiment.

The file history display GUI screen 40 has the search condition input area 41 for inputting a search condition and the search result display area 42 for displaying the search result. The search condition input area 41 has fields for inputting the document designation information and display history time information. Further, it may have a field for inputting a display condition. The file history is displayed in the search result display area 42.

In the example as shown in FIG. 15, the file history is illustrated.

Figure 16:
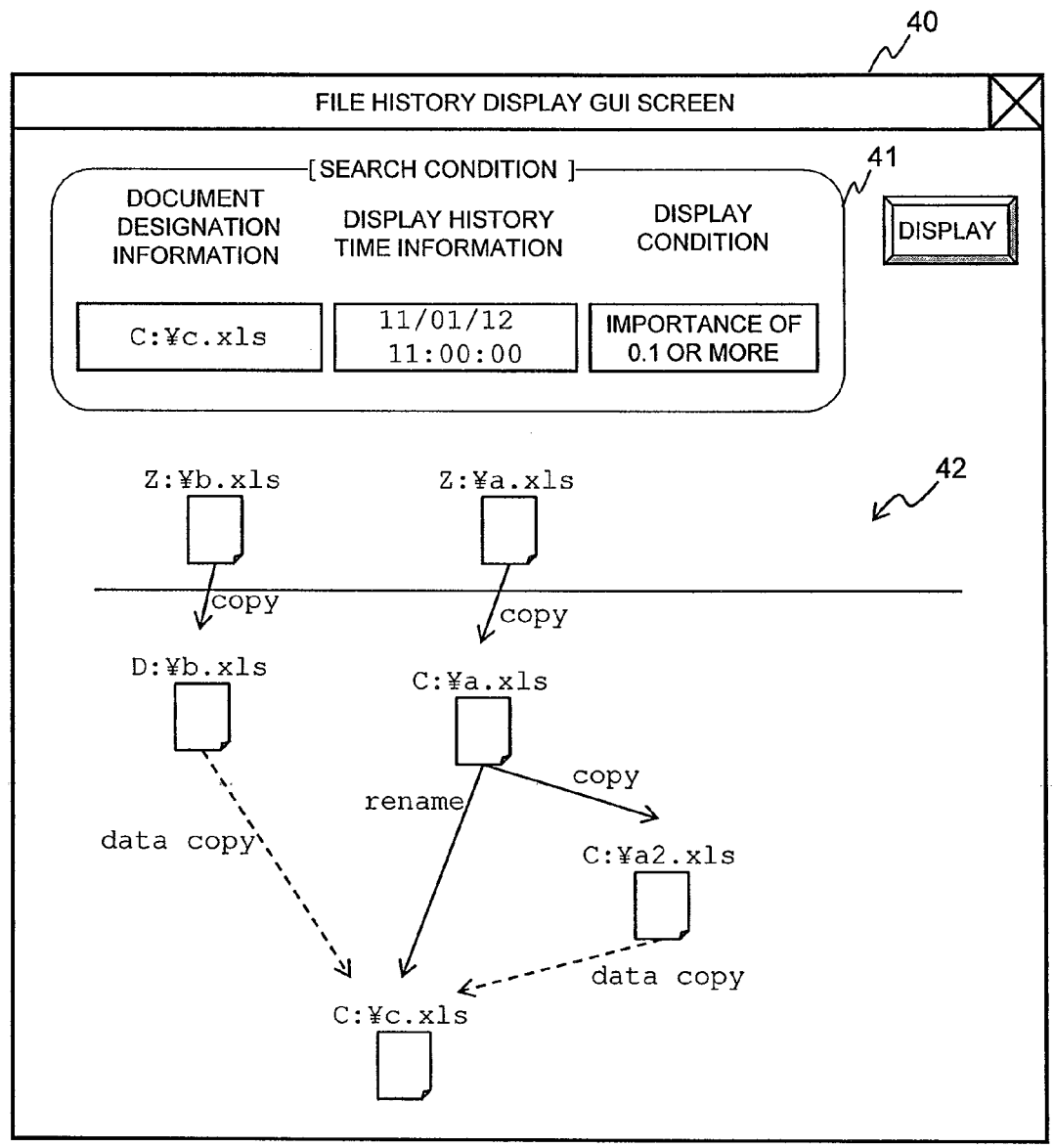
FIG. 16 is one example of the file history display screen according to the first embodiment in performing an operation of displaying only the file history with importance of 10% or more as a display condition of FIG. 15.

FIG. 16 is one example of the file history display screen according to the first embodiment in performing an operation of displaying only the file history with importance of 10% or more as the display condition of FIG. 15.

For example, the display condition is inputted into the search condition input area 41 by an operation of the manager or the like on the input part. As the display condition, for example, the importance is designated. The control part 22 displays the file history from the file history information database with importance 214 and the integrated file history information database 215, except for the file history with the importance out of accord with the display condition. Since the importance is not calculated except for copy & paste, all the history information may be displayed. In the example of FIG. 16, the copy & paste from "C:¥a3.xls" to "C:¥c.xls" has the importance of 0.05, which does not meet the display condition of "importance of 0.1 or more", and is not displayed. The history information with low importance may not be displayed, and the file history in which the importance agrees with the display condition may be highlighted.

Figure 17:
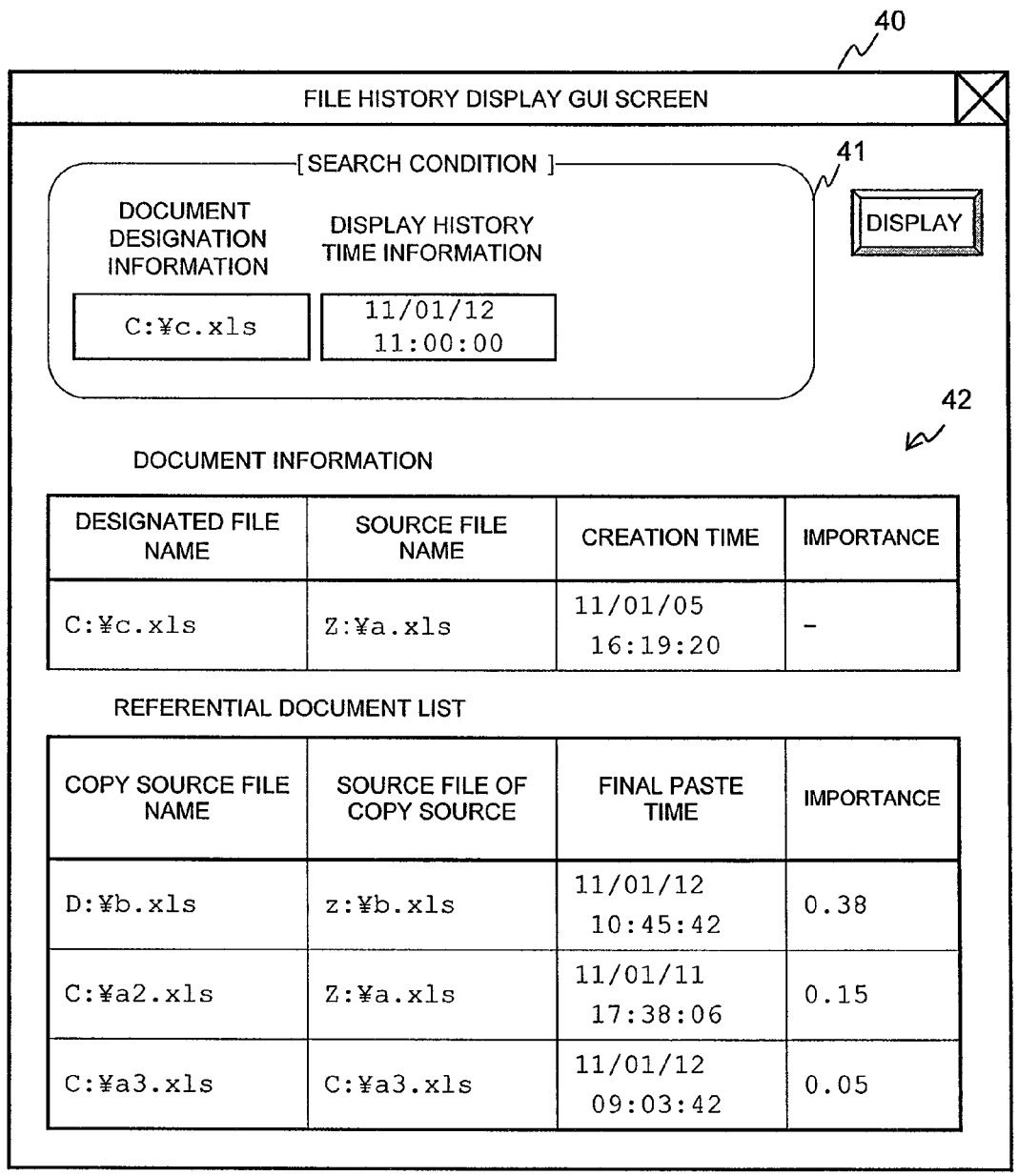
FIG. 17 is another example of the file history display screen according to the first embodiment.

FIG. 17 is another example of the file history display screen according to the first embodiment.

The search result display area 42 may be displayed in text format or table format, in addition to being displayed graphically. In the example of FIG. 17, a designated file name, a source file name (file corresponding to the root of file history) and creation time information are displayed as document information. Also, as the referential document information, a copy source file name, a source file, the final paste time and the importance are displayed in order of importance. Only a predetermined number of the referential document information may be displayed in order of importance. Any other information may be displayed, or the information may be displayed in any other format.

2. Second Embodiment

In a second embodiment, in the case of the copy & paste operation, the importance is obtained by taking into account the paste content. For the copy & paste of the content regarded particularly as important for the manager, the importance can be relatively high and likely to be displayed. The manager can designate the keyword to be emphasized.

As one example, for a remarks column in which the data size is great but the degree of influence of change is relatively small, the degree of contribution to the importance can be made low, while for the keyword concerning the price in which the data size is small but the degree of influence of change is relatively great, the degree of contribution to the importance can be made high.

(Hardware Configuration and Data Organization)

The system configuration and each device configuration are the same as in the first embodiment.

Figure 18:
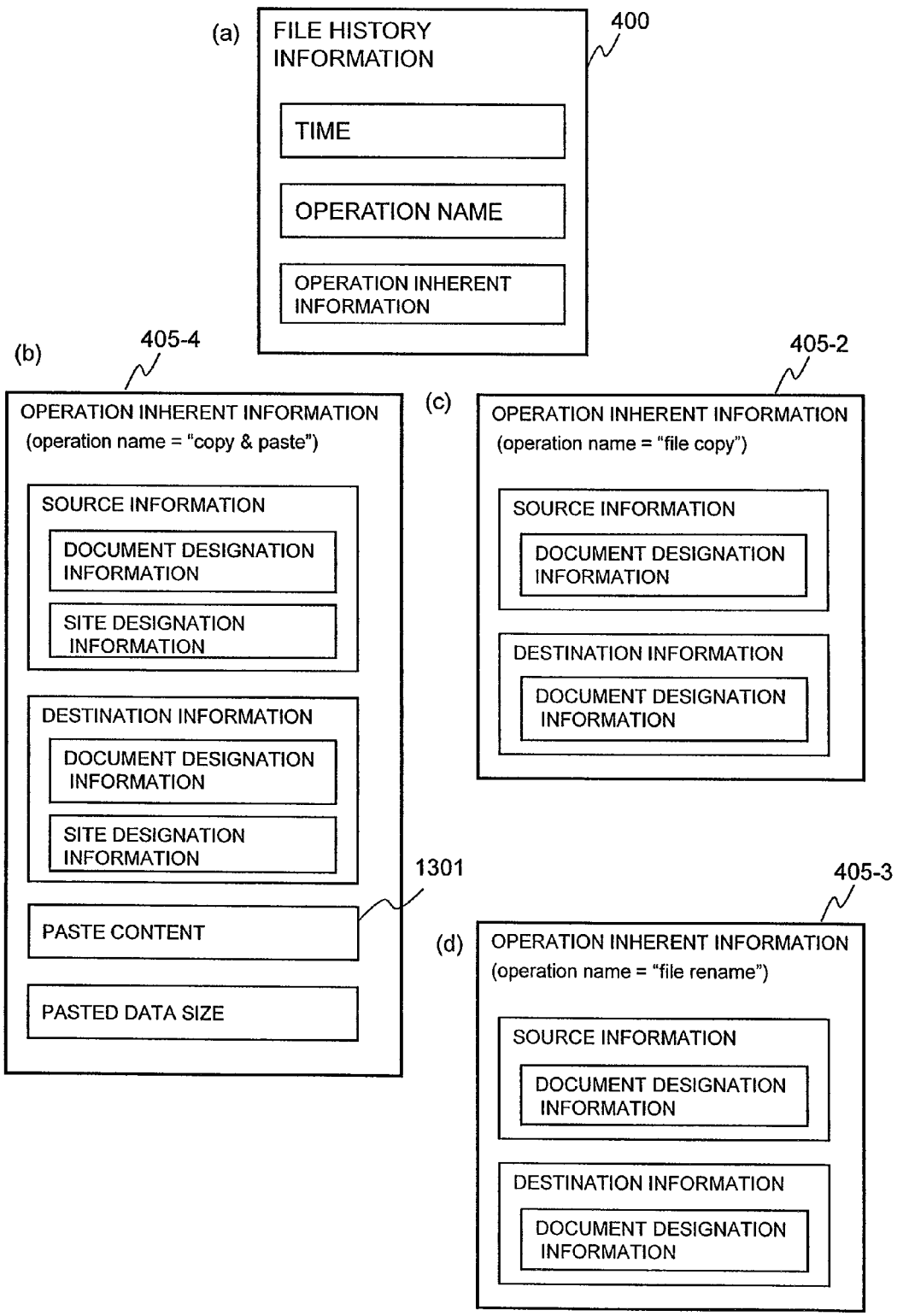
FIG. 18 is a view showing one example of the configuration of file history information including a paste content according to a second embodiment.

FIG. 18 is a view showing one example of the configuration of file history information including the paste content according to the second embodiment. As shown in FIG. 18(b), an operation inherent information 405-4 in which the operation name is copy & paste further includes a paste content (change content information) 1301 in addition to the operation inherent information of the first embodiment. The other configuration is the same as in the first embodiment.

Figure 19:
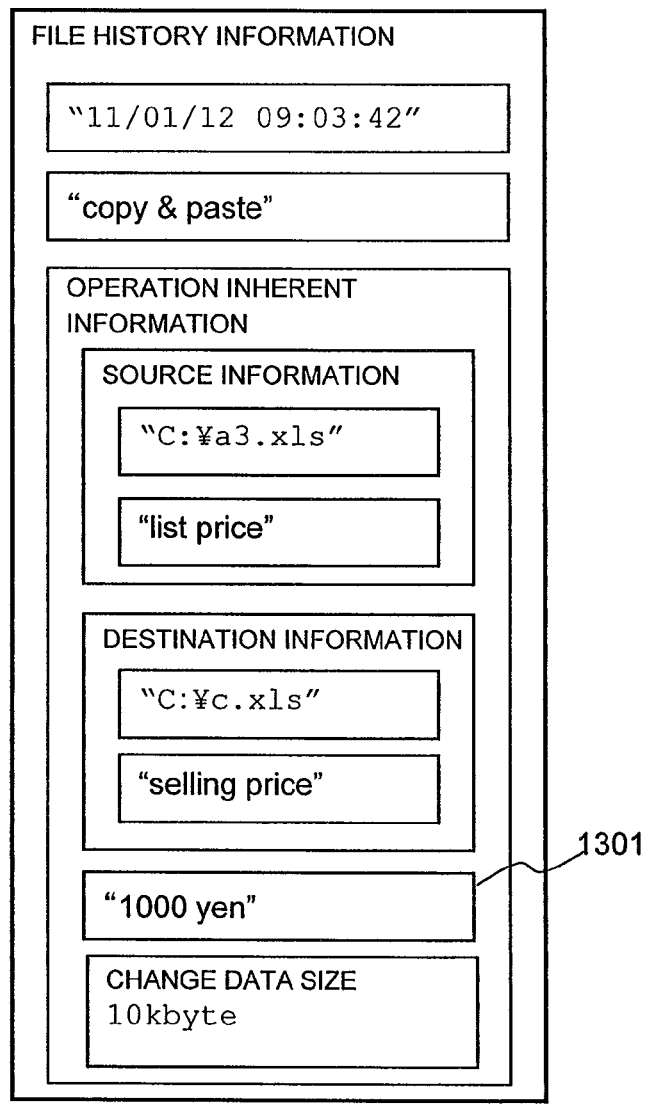
FIG. 19 is a view showing one example of acquired file history information including the paste content according to the second embodiment.

FIG. 19 is a view showing one example of acquired file history information including the paste content according to the second embodiment. For example, data of "1000 Yen" in a cell with a name of "list price" in a file of "C:¥a3.xls" is copied and pasted to a cell with a name of "selling price" in a file of "C:¥c.xls".

FIG. 20 is a view showing one example of a set of file history information including the paste content acquired from the user terminal 10 according to the second embodiment. The paste content is further included in the example of the first embodiment.

(Flowchart)

Figure 24:
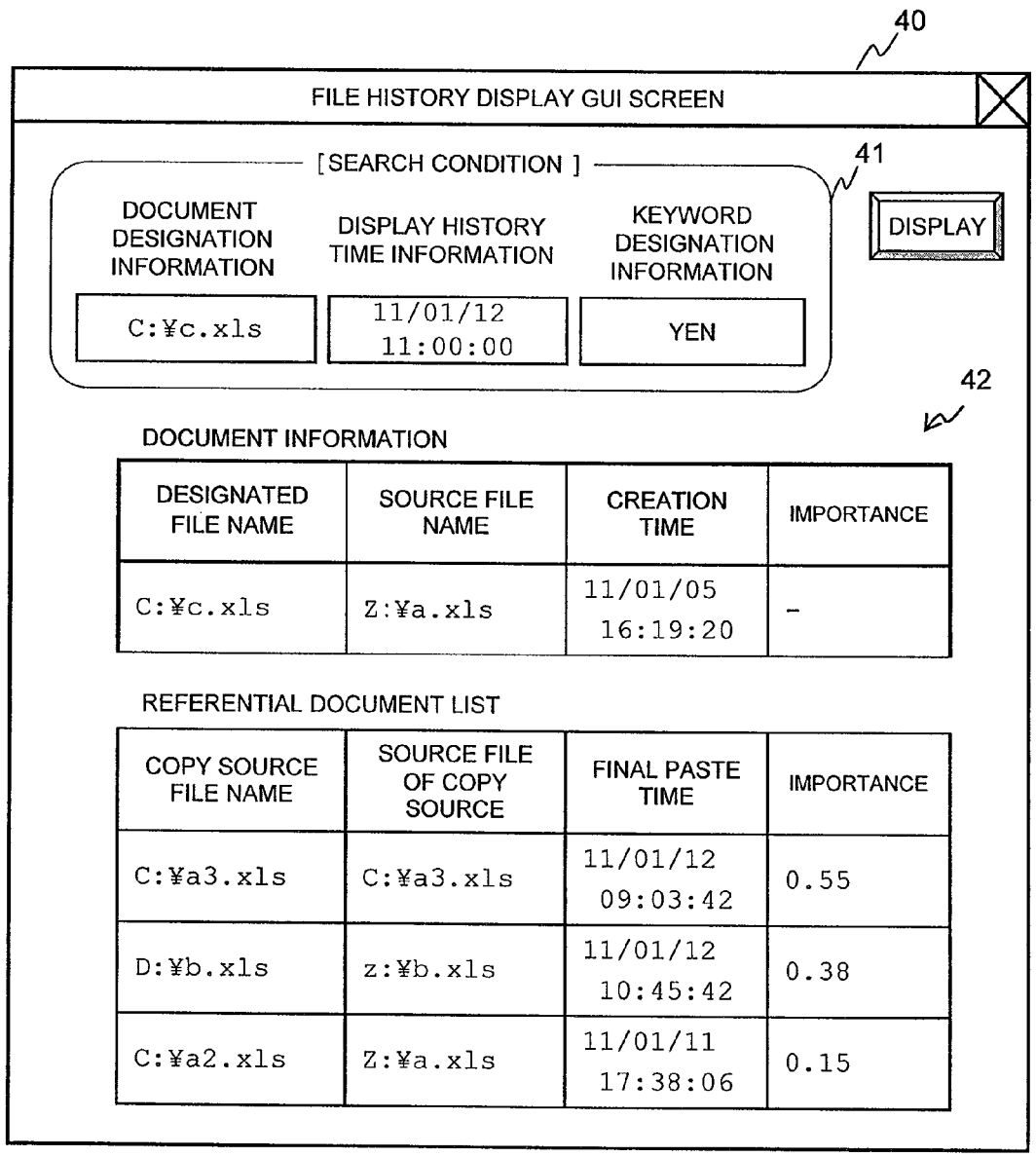
FIG. 24 is one example of a file history display screen for a result of calculating the importance by taking into account the paste content in which an item including "amount of money" is designated as important according to the second embodiment.
Figure 25:
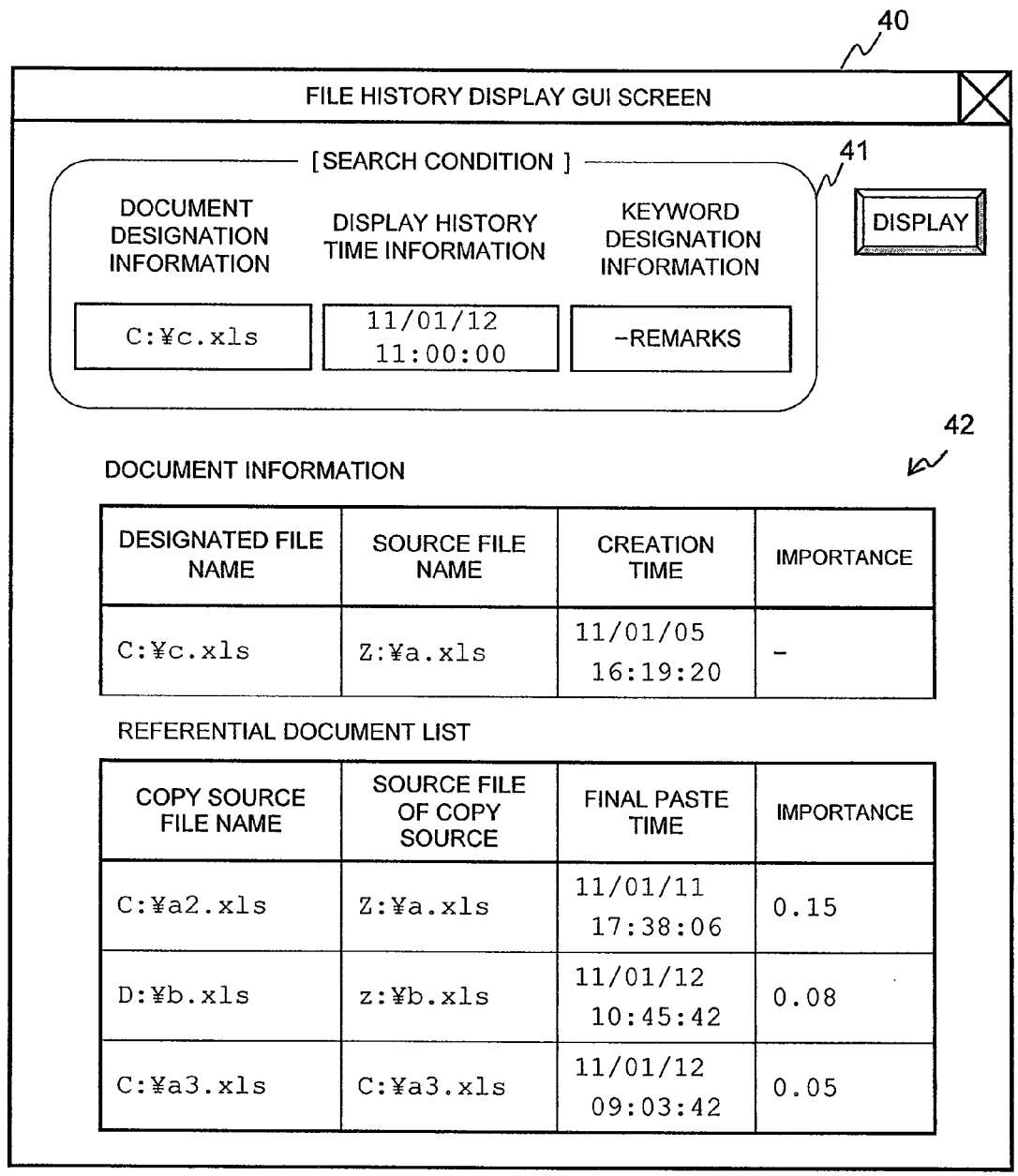
FIG. 25 is one example of the file history display screen for the result of calculating the importance by taking into account the paste content in which an item including "remarks" is designated as unimportant according to the second embodiment.

The overall flowchart is the same as the flowchart of FIG. 11 in the first embodiment. In the second embodiment, at step S101, the control part 22 further inputs keyword designation information. For example, the control part 22 displays the file history display GUI screen 40 as shown in FIGS. 24 and 25, and further inputs the keyword designation information, in addition to the document designation information (history display object file name) and the display history time information (history display time) inputted into the search condition input area 41. The keyword designation information may be the keyword included in the paste content as shown in FIG. 24, or the keyword included in the item name as shown in FIG. 25.

Figure 21:
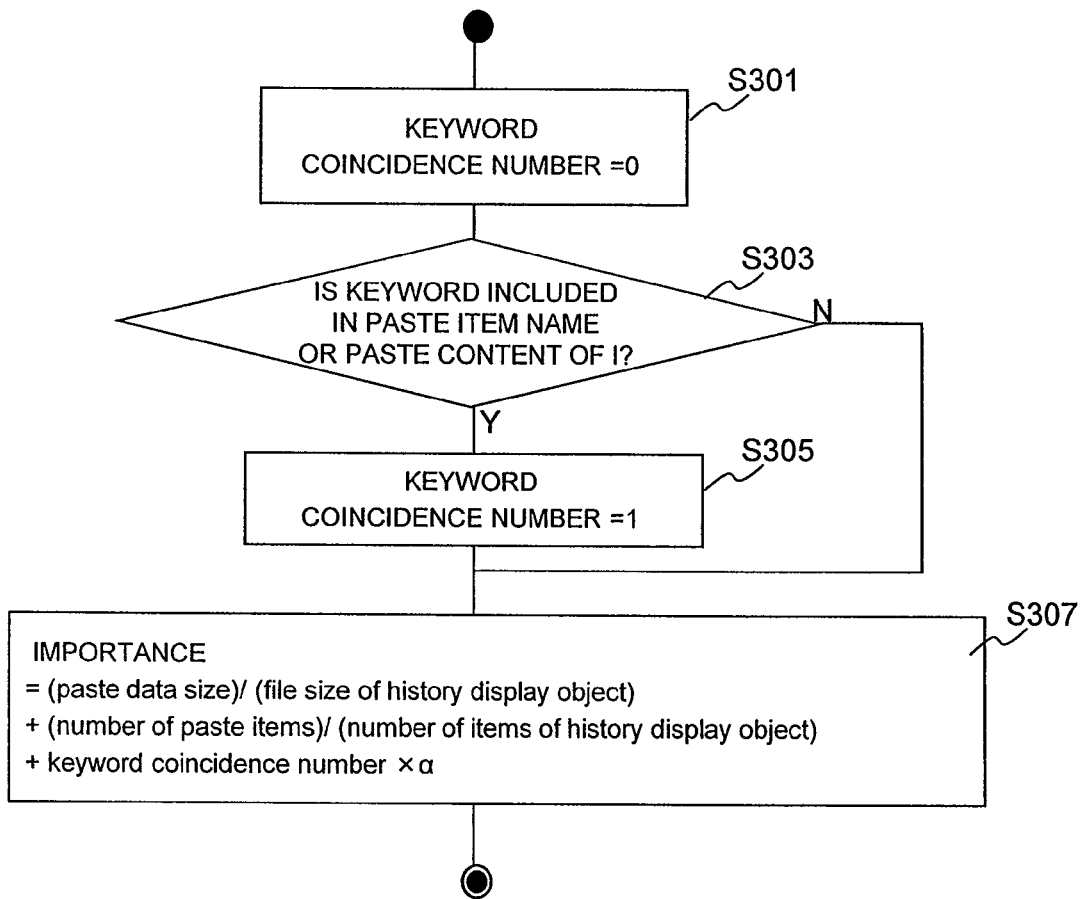
FIG. 21 is a flowchart showing a process for calculating the importance by taking into account the paste content according to the second embodiment.

Also, the details of the processing at step S117 are different from the first embodiment, and will be described below with reference to FIG. 21. FIG. 21 is a flowchart showing a process for calculating the importance by taking into account the paste content according to the second embodiment. FIG. 21 corresponds to the detailed flow of step S117.

First of all, the control part 22 initializes a keyword coincidence number to 0 (S301). The control part 22 judges whether or not the inputted keyword is included in a paste item name (the site designation information of the source information and the destination information) or the paste content in the entry of the file history serial number I (S303). If the keyword is not included, the operation passes to step S307.

On the other hand, if the keyword is included, the control part 22 sets the keyword coincidence number to 1 (S305). Plural keywords may be set, in which every time there is coincidence with each keyword, the keyword coincidence number may be increased (S307).

The control part 22 calculates the importance in accordance with the following formula (S307).

Importance=(paste data size)/(file size of history display object)+(number of paste items)/(number of items of history display object)+keyword coincidence number×α

Where α is a predetermined factor. For example, for the keyword for the remarks column in which the degree of influence of change is relatively small, α is set to be negative to make the importance lower, while for the keyword for the price, product name or personal information in which the degree of influence of change is relatively great, α is set to be positive to make the importance higher. Whether α is set to be positive or negative (the importance is made higher or lower) may be inputted into the search condition input area 41, or a list of pairs of keyword and α value may be pre-held in the control part 22. The other parameters are the same as at step S117 in the first embodiment.

The other process is the same as in the first embodiment. Also, the integration process is the same as in the first embodiment.

FIG. 22 is one example of the file history information with importance using the keyword according to the second embodiment. FIG. 23 is one example of the integrated file history information using the keyword according to the second embodiment.

(Display Example)

FIG. 24 is one example of the file history display screen for the result of calculating the importance by taking into account the paste content, in which the paste content including "Yen" is designated as important, according to the second embodiment.

FIG. 25 is one example of the file history display screen for the result of calculating the importance by taking into account the paste content, in which the item including "remarks" is designated as unimportant, according to the second embodiment.

FIGS. 24 and 25 are examples in which the file history is displayed in table format as shown in FIG. 17 in the first embodiment, but the file history may be displayed graphically as shown in FIGS. 15 and 16.

3. Third Embodiment

In a third embodiment, when there is data pasted to the same position in the same document, it is considered that the data at later time (time closer to the present time) is reflected, and the data at earlier time (former time) is overwritten and erased, whereby the data at earlier time is deleted in the process.

According to this embodiment, the process for the operation canceled at later step can be omitted.

(Hardware Configuration and Data Organization)

The system configuration and each device configuration are the same as in the first embodiment. In the file history management server 20, a determination exclusion list as will be described later is stored in the external storage device, for example.

FIG. 26 is one example of two pieces of file history information pasted to the same item of the same electronic document according to the third embodiment. In FIG. 26, for the sake of simplicity, only the file history information pasted to the same position of the same document is shown. For the history information pasted to the same position of the same document, the destination information is the same, as shown in FIG. 26.

Figure 27:
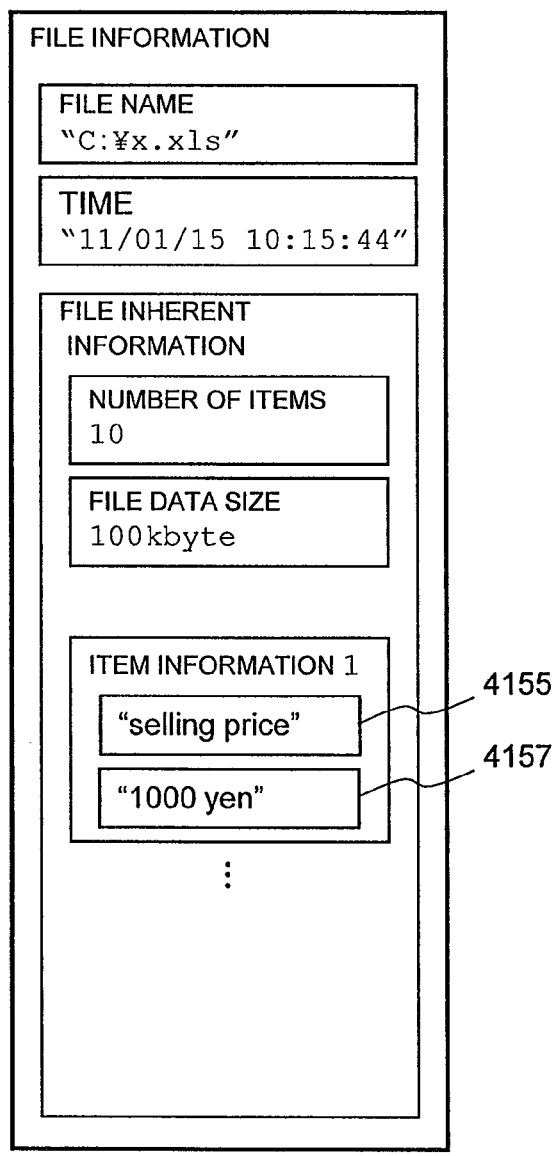
FIG. 27 is a view showing one example of file information showing the configuration of file information according to the third embodiment.

FIG. 27 is a view showing one example of file information showing the configuration of file information according to the third embodiment. The data at later time (time closer to the present time) is reflected on the file information.

FIG. 28 is one example of a determination exclusion list according to the third embodiment.

The determination exclusion list includes the document designation information and the site designation information for excluding the process for calculating the importance and the like. An appropriate identifier may be given to each entry.

(Flowchart)

The overall flowchart is the same as the flowchart of FIG. 11 in the first embodiment.

Figure 29:
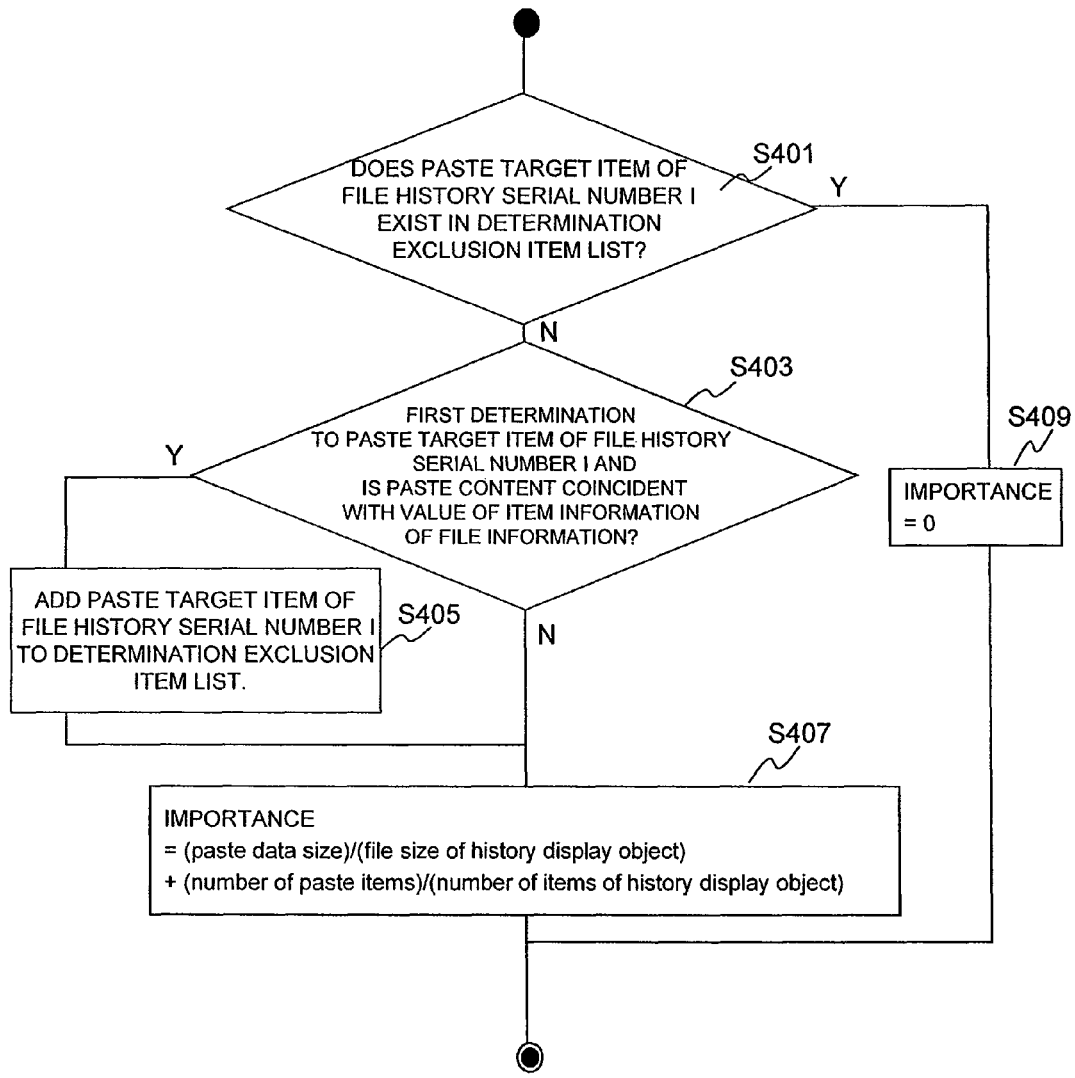
FIG. 29 is a flowchart showing a process for calculating the importance by ignoring all the paste processing before the same value is obtained as the final value of file information by a certain paste according to the third embodiment.

The details of the processing at step S117 are different from the first embodiment, and will be described below with reference to FIG. 29. FIG. 29 is a flowchart showing a process for calculating the importance by ignoring all the paste processing before the same value is obtained as the final value of file information by a certain paste according to the third embodiment. FIG. 29 corresponds to the detailed flow of step S117.

The control part 22 judges whether or not a paste target item of the file history serial number I exists in the determination exclusion item list (S401). More specifically, the control part 22 judges whether or not the designation information (information for specifying the paste target item) of an object entry in the file history information of the file history save part 21 exists in the determination exclusion list, with the entry in which id is matched with the file history serial number I as the object entry.

If the destination information exists in the determination exclusion list (S401, Yes), the control part 22 sets the importance to 0 (S409) and returns to the process of FIG. 11.

On the other hand, if the destination information does not exist in the determination exclusion list (S401, No), the control part 22 judges whether or not the first determination to the paste target item of the file history serial number I is made and the paste content is coincident with a value of item information in the file information (S403). The first determination to the paste target item or not can be judged by, for example, for the object entry in which id is matched with the file history serial number I, memorizing the past determination for the processing of this step in an appropriate way such as setting a flag of determination and checking the first determination to the paste target item (destination information) of the entry based on this flag. Also, the judgment as to whether the paste content is coincident with the value of the item information in the file information can be made by the control part 22 comparing the paste content of the object entry and a data content 4157 of the item information in the file information and judging the coincidence.

If the condition of step S403 is met (S403, Yes), the control part 22 adds the paste target item of the file history serial number I to the determination exclusion list (S405). For example, the document designation information and the site designation information included in the destination information of the object entry are stored in the determination exclusion list. Thereby, the file history serial number I is decremented at later step, whereby the old file history information with the same paste target item is detected at step S401 and the importance is set to 0 at step S409. Then, the operation goes to step S407. On the other hand, if the condition of step S403 is not met (S403, No), the operation goes to step S407.

The control part 22 calculates the importance in accordance with the following formula (S407).

Importance=(paste data size)/(file size of history display object)+(number of paste items)/(number of items of history display object)

Each parameter is the same as at step S117 in the first embodiment.

The other process of FIG. 11 is the same as in the first embodiment. Also, the integration process is the same as in the first embodiment.

FIG. 30 is one example of the file history information with importance using the determination exclusion according to the third embodiment. FIG. 31 is one example of the integrated file history information using the determination exclusion according to the third embodiment. In the illustrated examples, the importance is 0 in the entry with id=1 (corresponding to the file history information of the entry with id=1 in FIG. 26).

(Display Example)

Figure 32:
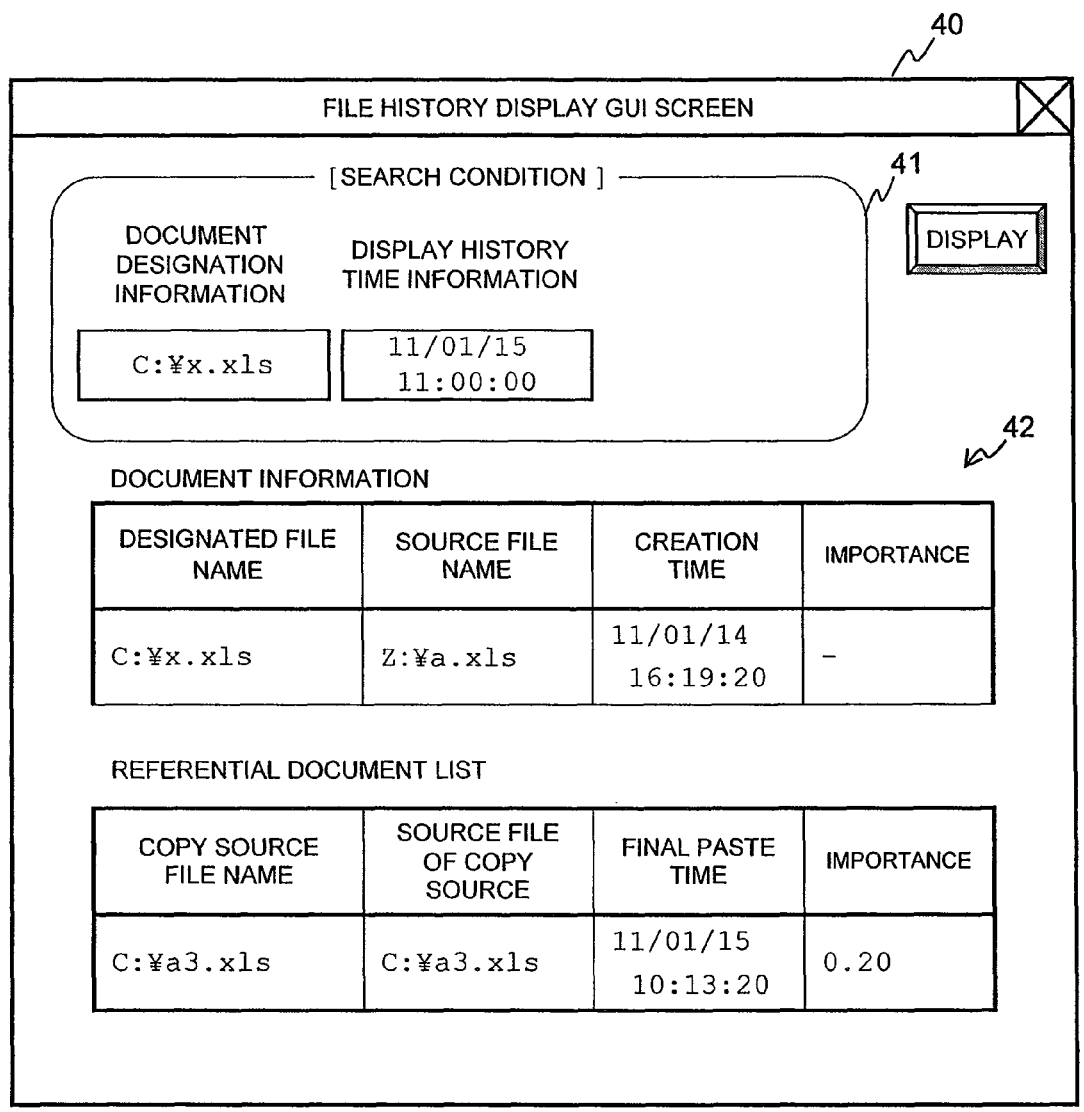
FIG. 32 is one example of a file history display screen for a result of calculating the importance through the process of FIG. 29 according to the third embodiment.

FIG. 32 is one example of the file history display screen for the result of calculating the importance through the process of FIG. 29 according to the third embodiment. This example is displayed in table format as shown in FIG. 17 of the first embodiment, but may be displayed graphically as shown in FIGS. 15 and 16. For example, when the file history is displayed in order of importance, or the importance for display is designated via the search condition input area 41, the file history information in which the importance is 0 is not displayed, whereby the user is more likely to make the visual confirmation.

4. Fourth Embodiment

Though in the above second embodiment, the paste content is recorded as the file history information and sent from the user terminal 10 to the file history management server 20, in a fourth embodiment the number of addition points (a minus value may be added) is preset for the keyword in the paste content and stored in the file history information recording part 11 of the user terminal 10. The file history information recording part 11 retrieves the paste content and a predetermined keyword in the item to obtain a paste point number, and sends the file history information with the paste point number appended to the file history management server 20.

In this embodiment, a load on the database of the file history management server 20 can be smaller than in the above second embodiment.

(Hardware Configuration and Data Organization)

In the fourth embodiment, the file history recording part 11 of the user terminal 10 has a paste point number database.

FIG. 33 is a view showing one example of the paste point number database registered in the file history information recording part 11 according to the fourth embodiment. In the paste point number database, the predetermined keyword and the paste point number (point number information) are stored associated. These pieces of information may be transmitted from the file history management server 20 to the user terminal 10, and stored in the user terminal 10. The paste point number (keyword contained information) may be an appropriate index or identifier corresponding to the importance, besides the value that can be directly added to the importance as shown in this embodiment.

As one example, like the second embodiment, for the remarks column in which the data size is great but the degree of influence of change is relatively small, the degree of contribution to the importance can be made low by making the paste point number the minus value, while for the keyword concerning the price in which the data size is small but the degree of influence of change is relatively great, the degree of contribution to the importance can be made high by making the paste point number the plus value. The value of the paste point number can be preset.

Figure 34:
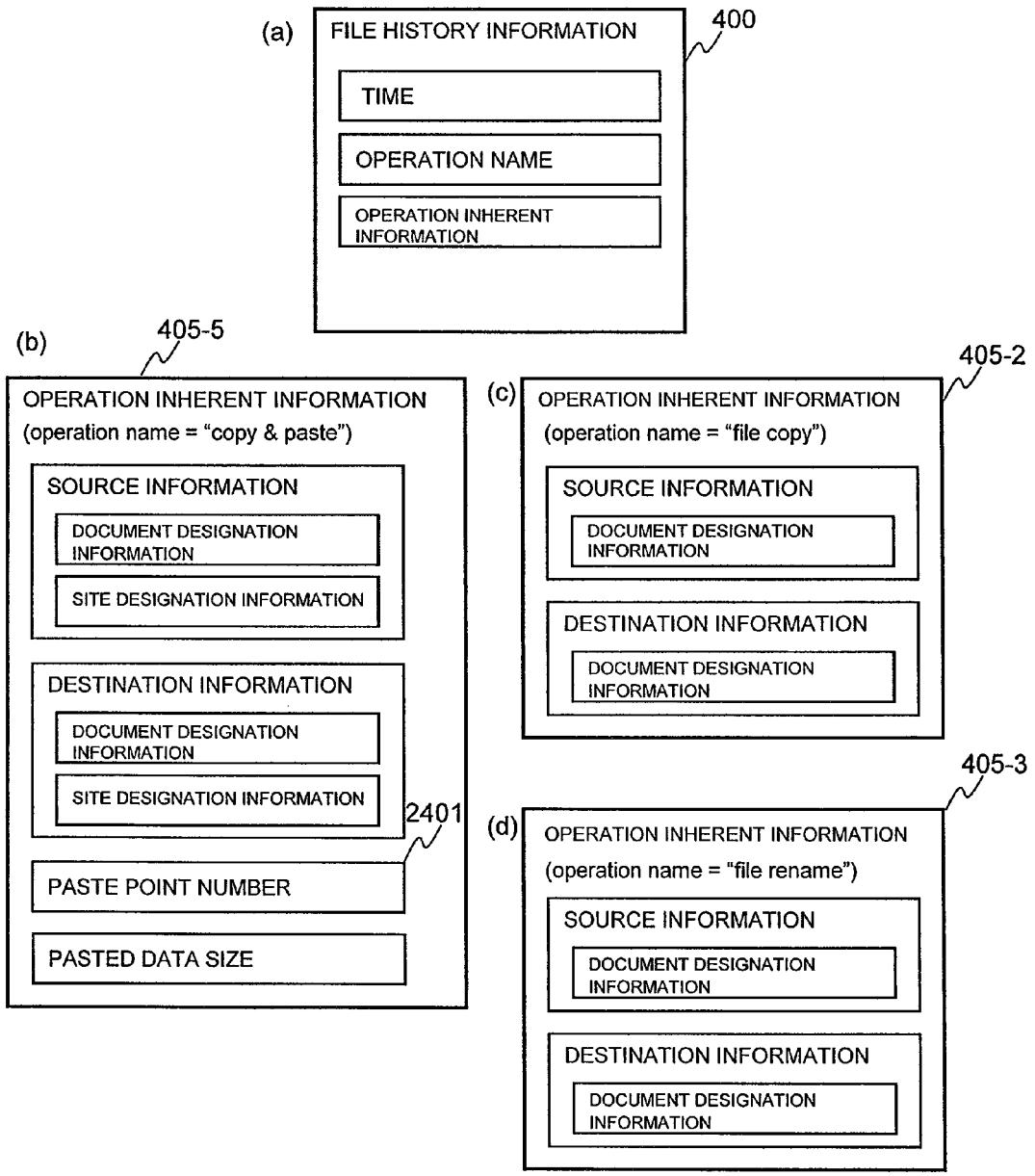
FIG. 34 is a view showing one example of the configuration of file history information including the paste point number determined by the keyword according to the fourth embodiment.

FIG. 34 is a view showing one example of the configuration of file history information including the paste point number determined based on the keyword according to the fourth embodiment. As shown in FIG. 34(b), an operation inherent information 405-5 in which the operation name is copy & paste further includes a paste point number 2401 in addition to the operation inherent information of the first embodiment. The other configuration is the same as in the first embodiment.

Figure 35:
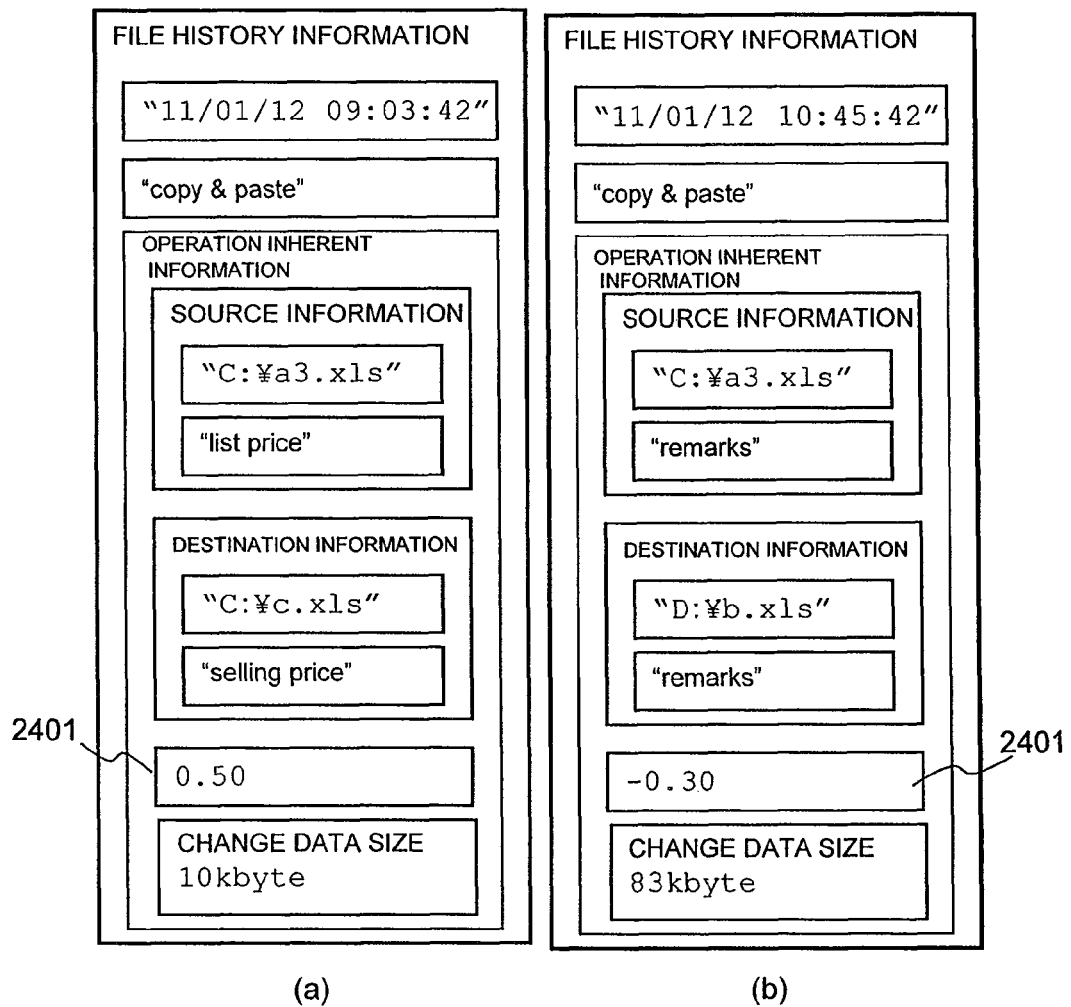
FIG. 35 is a view showing one example of acquired file history information including the paste point number according to the fourth embodiment.

FIG. 35 is a view showing one example of acquired file history information including the paste point number according to the fourth embodiment. In FIG. 35(a), the site designation information of the destination information is "selling price", and the paste point number 0.50 corresponding to the keyword "price" is included as the paste point number 2401. In FIG. 35(b), the site designation information of the destination information is "remarks", and the paste point number −0.30 corresponding to the keyword "remarks" is included as the paste point number 2401.

FIG. 36 is a view showing one example of a set of file history information including the paste point number determined by the keyword acquired from the user terminal 10 according to the fourth embodiment. The paste point number is further included in the example of the first embodiment.

The other parts of the system configuration and each device configuration are the same as in the first embodiment.

(Flowchart)

The overall flowchart is the same as the flowchart of FIG. 11 in the first embodiment.

Figure 37:
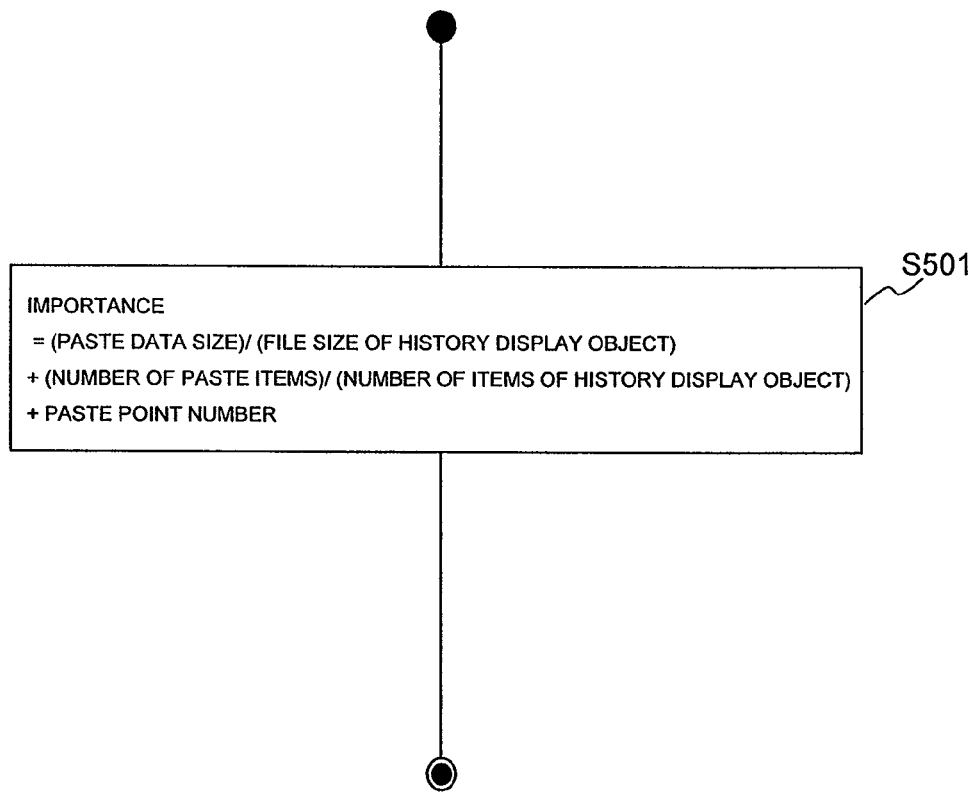
FIG. 37 is a flowchart showing a process for calculating the importance by taking into account the paste point number according to the fourth embodiment.

The details of the processing at step S117 are different from the first embodiment, and will be described below with reference to FIG. 37. FIG. 37 is a flowchart showing a process for calculating the importance by taking into account the paste point number according to the fourth embodiment. FIG. 37 corresponds to the detailed flow of step S117.

The control part 22 calculates the importance in accordance with the following formula (S501).

Importance=(paste data size)/(file size of history display object)+(number of paste items)/(number of items of history display object)+paste point number For the paste point number, the paste point number stored in the object entry of the file history save part 21 can be used. The other parameters are the same as at step S117 in the first embodiment.

The other process of FIG. 11 is the same as in the first embodiment. Also, the integration process is the same as in the first embodiment.

FIG. 38 is one example of the file history information with importance using the paste point number according to the fourth embodiment. FIG. 39 is one example of the integrated file history information using the paste point number according to the fourth embodiment. For example, the importance is lower for the file history in which the item of "remarks" is modified (e.g., entry with id=021), while the importance is higher for the file history pasted to the item of "selling price" (e.g., entry with id=013).

(Display Example)

Figure 40:
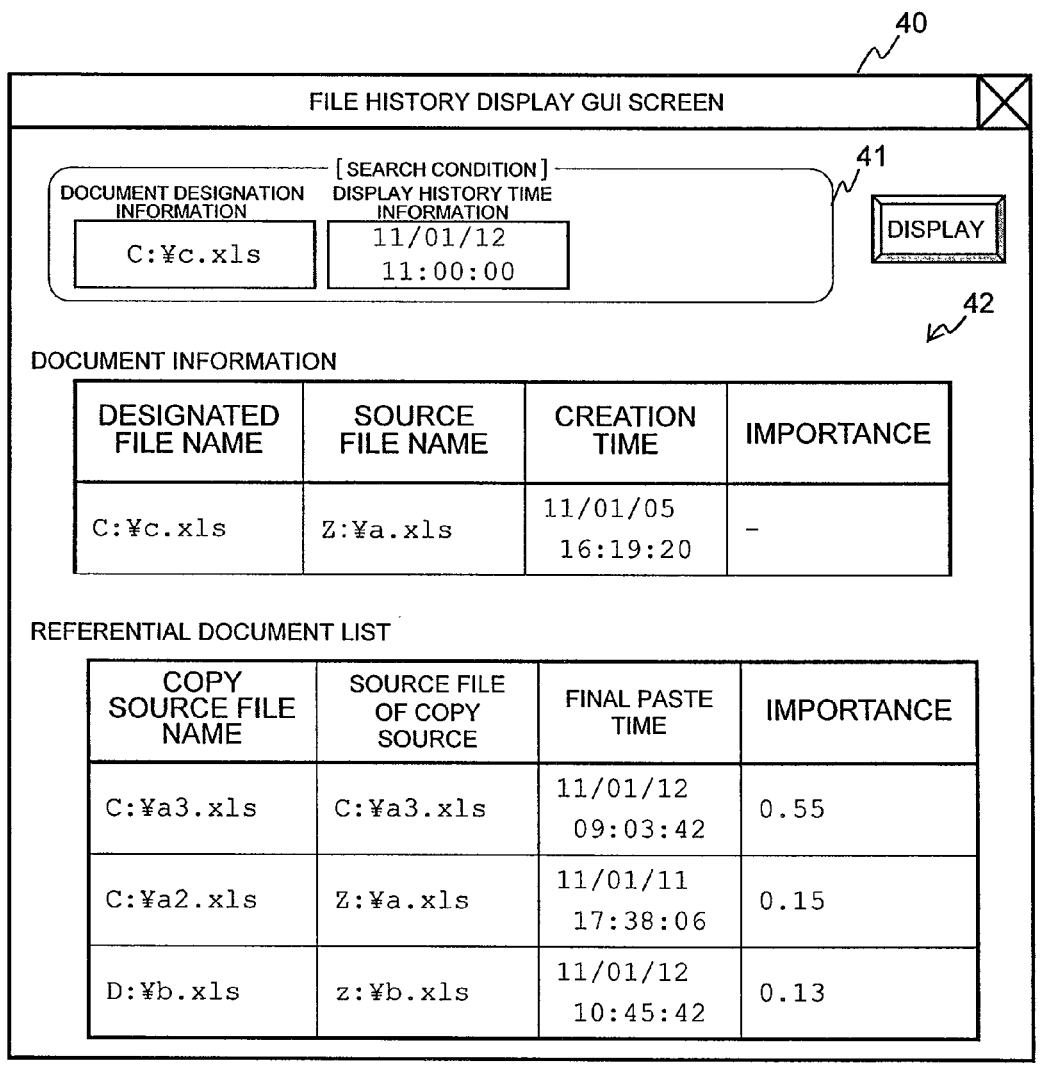
FIG. 40 is one example of a file history display screen for the result of calculating the importance by taking into account the paste point number according to the fourth embodiment.

FIG. 40 is one example of the file history display screen for the result of calculating the importance by taking into account the paste point number according to the fourth embodiment. This example is displayed in table format, but may be displayed graphically.

5. Configuration Example

A file history recording/display method of the invention enables a computer to record and display the file history, for example, comprising a file history recording part for recording the file history, the file history recording part having a function of recording the file history, an input part having a function of inputting a specific file for which a user wants to display a relevant file history, and a file history display part for displaying the file history recorded by the file history recording part, the file history display part having a function of determining the importance of the file history and a function of highlighting and displaying the file history with high importance or displaying only the file history with high importance.

In the above file history recording/display method, one of the features is that the file history recording part records the file history in a header of a file.

In the above file history recording/display method, one of the features is that the file history recording part records the file history in a server.

In the above file history recording/display method, one of the features is that the file history is composed of any one or all of the file move, copy and copy & paste of data between files.

In the above file history recording/display method, the file history recording part records any one or all of a changed item, a changed file size, a total file size after change, and a change content at the same time in recording the file history.

In the above file history recording/display method, the file history display part determines the importance based on one or both of the changed size and the number of changed items.

In the above file history recording/display method, the input part has a function of inputting a keyword emphasized by the user, or a keyword ignored, and the file history display part performs a display process by increasing the importance if the item including the keyword is changed, the changed content includes the keyword, or the keyword is emphasized, or decreasing the importance if the keyword is ignored.

In the above file history recording/display method, the file history display part determines the importance based on only the file history that is finally reflected on the content of data at the time requested by the user from individual change content included in the each file history.

In the above file history recording/display method, one of the features is that the file history recording part records keyword contained information as to whether one or both of the change item and the change content includes the keyword emphasized or ignored by the user, when recording the file history, and the file history display part determines the importance by taking into account the keyword contained information.

In the above file history recording/display method, one of the features is that there is provided a function of extracting and displaying an important file that is a source of outflow file from the file history.

INDUSTRIAL APPLICABILITY

This invention is applicable to a security field of electronic files, for example, particularly a system for the management of electronic classified documents.

The invention claimed is:

1. A file history recording system comprising:
one or more processors; and
one or more memory or storage devices connected to the one or more processors, and storing instructions that, when executed by the one or more processors, cause the one or more processors to execute: a file history recording part for creating file history information for a plurality of files, the file history information including a file change content by an operation of an operator to one or more of the files and including information specifying a paste data size and a number of pasted items for a copy and paste operation of data in one or more of the files;

a file history save part for successively accumulating the file history information in the one or more memory or storage devices;

a control part for obtaining one or more source files that are one or more sources of a desired file by searching the accumulated file history information for the desired file; and a file history display part for displaying the one or more source files that are the source of the desired file, wherein the control part obtains a choice index of the file history information based on a degree of change of data between the desired file and the one or more source files, and highlights and displays a part of the file history information for the desired file in accordance with the choice index, or displays the file history information selected in accordance with the choice index, in the file history display part, wherein the control part obtains the choice index of the file history information by adding a ratio of the paste data size to an overall file data size and a ratio of the number of pasted items to a total number of items in the file, wherein the file history recording part records keyword contained information indicating whether one or both of a change item and the file change content in the one or more files includes a predetermined keyword emphasized by a user or a predetermined keyword unstressed by the user, when creating the file history information, wherein the file history recording part has a point number database storing point number information for increasing or decreasing the choice index corresponding to the predetermined keyword emphasized by the user or the predetermined keyword unstressed by the user, wherein the file history recording part records the point number information for the predetermined keyword in the keyword contained information by referring to the point number database, if one or both of the change item and the change content includes the predetermined keyword emphasized by the user or the predetermined keyword unstressed by the user, when creating the file history information, and wherein the control part increases or decreases the choice index of the obtained file history information in accordance with the keyword contained information, when obtaining the choice index.

2. The file history recording system according to claim 1, wherein
the file history recording part creates file information including the overall file data size after change and/or the total number of items in the files and outputs the file information to the control part, and
the control part obtains the choice index using information included in the file history information and the file information.

3. The file history recording system according to claim 1, further comprising:
one or more user terminals each having one of the processors and one of the memory or storage devices, and which execute the file history recording part, and
a file history management server having one of the processors and one of the memory or storage devices, and which executes the file history save part and the control part,
wherein the file history save part accumulates successively the file history information received from the file history recording part of the user terminal.

4. The file history recording system according to claim 1, wherein the control part obtains the choice index by excluding an old file history information, if destination information is the same in plural pieces of the file history information for a copy and paste operation.

5. The file history recording system according to claim 1, wherein the one or more memory or storage devices further store instructions that, when executed by the one or more processors, cause the one or more processors to execute:
extracting and displaying an importance file that is a source of outflow file from a file history.

6. A file history management device comprising:
one or more processors; and
at least one memory or storage device connected to the one or more processors, and storing instructions that, when executed by the one or more processors, cause the one or more processors to execute:
a file history recording part for creating file history information for a plurality of files, the file history information including a file change content by an operation of an operator to one or more of the files and including information specifying a paste data size and a number of pasted items for a copy and paste operation of data in one or more of the files;
a file history save part for receiving file history information including a file change content by an operation of an operator and successively accumulating the file history information in the at least one memory or storage device;
a control part for obtaining one or more source files that are one or more sources of a desired file by searching the file history information accumulated in the file history save part for the desired file; and
a file history display part for displaying the one or more source files that are the source of the desired file,
wherein the control part obtains a choice index of the file history information based on a degree of change of data between the desired file and the one or more source files, and highlights and displays a part of the file history information for the desired file in accordance with the choice index, or displays the file history information selected in accordance with the choice index, in the file history display part,
wherein the control part obtains the choice index of the file history information by adding a ratio of the paste data size to an overall file data size and a ratio of the number of pasted items to a total number of items in the file,
wherein the file history recording part records keyword contained information indicating whether one or both of a change item and the change content in the one or more files includes a predetermined keyword emphasized by a user or a predetermined keyword unstressed by the user, when creating the file history information,
wherein the file history recording part has a point number database storing point number information for increasing or decreasing the choice index corresponding to the predetermined keyword emphasized by the user or the predetermined keyword unstressed by the user,
wherein the file history recording part records the point number information for the predetermined keyword in the keyword contained information by referring to the point number database, if one or both of the change item and the change content includes the predetermined keyword emphasized by the user or the predetermined keyword unstressed by the user, when creating the file history information, and wherein the control part increases or decreases the choice index of the obtained file history information in accordance with the keyword contained information, when obtaining the choice index.

7. A file history recording method comprising the steps of:

creating file history information for a plurality of files, the file history information including a file change content by an operation of an operator to one or more of the files and including information specifying a paste data size and a number of pasted items for a copy and paste operation of data in one or more of the files;

successively accumulating the file history information in a memory or storage device;

obtaining one or more source files that are one or more sources of a desired file by searching the accumulated file history information for the desired file; and displaying the one or more source files that are the source of the desired file, wherein a choice index of the file history information is obtained based on a degree of change of data between the desired file and the one or more source files, and highlighting and displaying a part of the file history information for the desired file in accordance with the choice index, or displaying the file history information selected in accordance with the choice index, wherein the choice index of the file history information is obtained by adding a ratio of the paste data size to an overall file data size and a ratio of the number of pasted items to a total number of items in the file, wherein keyword contained information is recorded that indicates whether one or both of a change item and the file change content in the one or more files includes a predetermined keyword emphasized by a user or a predetermined keyword unstressed by the user, when creating the file history information, wherein a point number database stores point number information for increasing or decreasing the choice index corresponding to the predetermined keyword emphasized by the user or the predetermined keyword unstressed by the user, wherein the point number information is recorded for the predetermined keyword in the keyword contained information by referring to the point number database, if one or both of the change item and the change content includes the predetermined keyword emphasized by the user or the predetermined keyword unstressed by the user, when creating the file history information, and wherein the choice index of the obtained file history information is increased or decreased in accordance with the keyword contained information, when obtaining the choice index.

* * * * *